(12) United States Patent
Marshall et al.

(10) Patent No.: US 11,680,010 B2
(45) Date of Patent: Jun. 20, 2023

(54) EVALUATION OF TRANSPARENT COMPONENTS FOR ELECTRONIC DEVICES

(71) Applicant: Apple Inc., Cupertino, CA (US)

(72) Inventors: Tyler A. Marshall, Sunnyvale, CA (US); Christopher C. Bartlow, Menlo Park, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/903,896

(22) Filed: Jun. 17, 2020

(65) Prior Publication Data

US 2021/0009469 A1    Jan. 14, 2021

Related U.S. Application Data

(60) Provisional application No. 62/872,131, filed on Jul. 9, 2019.

(51) Int. Cl.
| | | |
|---|---|---|
| *G01N 21/21* | (2006.01) | |
| *B44C 1/00* | (2006.01) | |
| *C03C 17/30* | (2006.01) | |

(52) U.S. Cl.
CPC .............. *C03C 17/30* (2013.01); *B44C 1/00* (2013.01); *G01N 21/21* (2013.01)

(58) Field of Classification Search
None
See application file for complete search history.

(56) References Cited

U.S. PATENT DOCUMENTS

| | | |
|---|---|---|
| 2,795,084 A | 6/1957 | Littleton |
| 3,410,673 A | 11/1968 | Marusak |
| 3,433,611 A | 3/1969 | Kubican |
| 3,464,880 A | 9/1969 | Rinehart |
| 3,737,294 A | 6/1973 | Dumbaugh, Jr. et al. |
| 3,746,526 A | 7/1973 | Giffon |
| 3,899,315 A | 8/1975 | Siegmund |
| 4,054,895 A | 10/1977 | Ham et al. |
| 4,070,211 A | 1/1978 | Haran et al. |
| 4,209,229 A | 6/1980 | Rittler |
| 4,339,300 A | 7/1982 | Noble et al. |
| 4,735,917 A | 4/1988 | Flatley et al. |

(Continued)

FOREIGN PATENT DOCUMENTS

| | | |
|---|---|---|
| CN | 101475300 | 7/2009 |
| CN | 103986803 | 8/2013 |

(Continued)

OTHER PUBLICATIONS

Aben et al., "A New Method for Tempering Stress Measurement in Glass Panels," Estonian Journal of Engineering, vol. 19, No. 4, pp. 292-297, 2013.

(Continued)

*Primary Examiner* — Kenneth J Stachel

(74) *Attorney, Agent, or Firm* — Brownstein Hyatt Farber Schreck, LLP

(57) ABSTRACT

Methods for evaluating a chemically strengthened housing component for an electronic device are disclosed. These methods may allow non-destructive determination of whether the chemical strengthening of the component meets specifications. Systems suitable for use with the methods are also disclosed.

19 Claims, 15 Drawing Sheets

(56) References Cited

U.S. PATENT DOCUMENTS

| | | |
|---|---|---|
| 4,849,299 A | 7/1989 | Loth et al. |
| 5,122,177 A | 6/1992 | Yoshizama et al. |
| 5,173,453 A | 12/1992 | Beall et al. |
| 5,273,553 A | 12/1993 | Hoshi et al. |
| 6,055,053 A | 4/2000 | Lesniak |
| 6,067,005 A | 5/2000 | DeVolpi |
| 6,169,256 B1 | 1/2001 | Hanahara |
| 6,406,769 B1 | 6/2002 | Delabre et al. |
| 6,809,278 B2 | 10/2004 | Tsubaki |
| 6,928,224 B2 | 8/2005 | Beall et al. |
| 7,115,827 B2 | 10/2006 | Tseng |
| 7,240,519 B2 | 7/2007 | Schwartz et al. |
| 7,459,199 B2 | 12/2008 | Skeen |
| 7,497,093 B2 | 3/2009 | Rosenflanz |
| 7,507,918 B2 | 3/2009 | Kazama |
| 7,799,158 B2 | 9/2010 | Yokoyama et al. |
| 7,902,474 B2 | 3/2011 | Mittleman |
| 7,915,556 B2 | 3/2011 | Ou |
| 7,966,785 B2 | 6/2011 | Zadesky et al. |
| 8,003,217 B2 | 8/2011 | Rosenflanz |
| 8,050,019 B2 | 11/2011 | Wennemer |
| 8,092,737 B2 | 1/2012 | Chang et al. |
| 8,212,455 B2 | 7/2012 | Yura et al. |
| 8,277,704 B2 | 10/2012 | Matsushima et al. |
| 8,379,159 B2 | 2/2013 | Hsu |
| 8,431,849 B2 | 4/2013 | Chen |
| 8,446,264 B2 | 5/2013 | Tanase |
| 8,665,160 B2 | 3/2014 | Uttermann et al. |
| 8,717,513 B2 | 5/2014 | Park et al. |
| 8,783,065 B2 | 7/2014 | Schillert et al. |
| 8,840,997 B2 | 9/2014 | Koyama et al. |
| 8,898,824 B2 | 12/2014 | Neidich et al. |
| 9,001,503 B1 | 4/2015 | Hibino |
| 9,030,440 B2 | 5/2015 | Pope |
| 9,069,198 B2 | 6/2015 | Kim et al. |
| 9,110,230 B2 | 8/2015 | Koch, III et al. |
| 9,125,298 B2 | 9/2015 | Russell-Clarke |
| 9,134,547 B2 | 9/2015 | McCabe et al. |
| 9,140,522 B1 | 9/2015 | Miller et al. |
| 9,154,678 B2 | 10/2015 | Kwong et al. |
| 9,193,625 B2 | 11/2015 | Bookbinder et al. |
| 9,232,672 B2 | 1/2016 | Kwong |
| 9,242,889 B2 | 1/2016 | Yamakaji et al. |
| 9,249,045 B2 | 2/2016 | Gabel et al. |
| 9,263,209 B2 | 2/2016 | Chen |
| 9,302,937 B2 | 4/2016 | Gulati et al. |
| 9,321,677 B2 | 4/2016 | Chang et al. |
| 9,359,251 B2 | 6/2016 | Bookbinder et al. |
| 9,375,900 B2 | 6/2016 | Tsuchiya et al. |
| 9,390,930 B2 | 7/2016 | Rogers et al. |
| 9,392,706 B2 | 7/2016 | Yoo et al. |
| 9,429,997 B2 | 8/2016 | Myers et al. |
| 9,474,174 B2 | 10/2016 | Motohashi |
| 9,516,149 B2 | 12/2016 | Wright et al. |
| 9,522,836 B2 | 12/2016 | Gulati et al. |
| 9,524,413 B2 | 12/2016 | Kim |
| 9,632,537 B2 | 4/2017 | Memering et al. |
| 9,674,322 B2 | 6/2017 | Motohashi et al. |
| 9,678,540 B2 | 6/2017 | Memering et al. |
| 9,697,409 B2 | 7/2017 | Myers |
| 9,718,727 B2 | 8/2017 | Bookbinder et al. |
| 9,728,349 B2 | 8/2017 | Huang |
| 9,840,435 B2 | 12/2017 | Ohara et al. |
| 9,846,473 B1 | 12/2017 | Kalscheur et al. |
| 9,870,880 B2 | 1/2018 | Zercoe |
| 9,890,074 B2 | 2/2018 | Liu |
| 9,897,574 B2 | 2/2018 | Roussev et al. |
| 9,902,138 B2 | 2/2018 | Edwards |
| 9,902,641 B2 | 2/2018 | Hall et al. |
| 9,941,074 B2 | 4/2018 | Tu |
| 9,946,302 B2 | 4/2018 | Franklin et al. |
| 9,963,374 B2 | 5/2018 | Jouanno et al. |
| 10,133,156 B2 | 11/2018 | Pilliod et al. |
| 10,141,133 B2 | 11/2018 | Bae |
| 10,146,982 B2 | 12/2018 | Hsu |
| 10,189,228 B2 | 1/2019 | Couillard et al. |
| 10,206,298 B2 | 2/2019 | Memering et al. |
| 10,286,631 B2 | 5/2019 | Alder et al. |
| 10,318,783 B2 | 6/2019 | Kang |
| 10,324,496 B2 | 6/2019 | Kwong et al. |
| 10,357,945 B2 | 7/2019 | Beall et al. |
| 10,425,994 B2 | 9/2019 | Weiss et al. |
| 10,494,860 B1 | 12/2019 | Jones et al. |
| 10,513,455 B2 | 12/2019 | Cook et al. |
| 10,611,666 B2 | 4/2020 | Jones et al. |
| 10,694,010 B2 | 6/2020 | Jones et al. |
| 10,702,211 B2 | 7/2020 | Clavelle et al. |
| 10,800,141 B2 | 10/2020 | Bartlow et al. |
| 10,827,635 B1 | 11/2020 | Limarga et al. |
| 10,875,277 B2 | 12/2020 | Aoki et al. |
| 10,899,660 B2 | 1/2021 | Luzzato et al. |
| 10,917,505 B2 | 2/2021 | Jones et al. |
| 10,919,270 B2 | 2/2021 | Oh et al. |
| 11,192,823 B2 | 12/2021 | Li et al. |
| 11,199,929 B2 | 12/2021 | Poole et al. |
| 2003/0040346 A1 | 2/2003 | Fukuda et al. |
| 2003/0062490 A1 | 4/2003 | Fujieda |
| 2004/0003627 A1 | 1/2004 | Hashima |
| 2004/0041504 A1 | 3/2004 | Ozolins |
| 2004/0105026 A1 | 6/2004 | Campbell et al. |
| 2005/0135724 A1 | 6/2005 | Helvajian |
| 2005/0176506 A1 | 8/2005 | Goto |
| 2008/0049980 A1 | 2/2008 | Castaneda |
| 2008/0316687 A1 | 12/2008 | Richardson et al. |
| 2009/0040737 A1 | 2/2009 | Shimura |
| 2010/0013786 A1 | 1/2010 | Nishikawa et al. |
| 2010/0108486 A1 | 5/2010 | Yoshida |
| 2010/0127420 A1 | 5/2010 | Dannoux |
| 2010/0148996 A1 | 6/2010 | Wang |
| 2010/0263708 A1 | 10/2010 | Reichart et al. |
| 2010/0279068 A1 | 11/2010 | Cook et al. |
| 2010/0285310 A1 | 11/2010 | Izutani et al. |
| 2010/0330814 A1 | 12/2010 | Yokota |
| 2011/0038115 A1 | 2/2011 | Halkosaari |
| 2011/0041987 A1 | 2/2011 | Hori et al. |
| 2011/0177300 A1 | 7/2011 | Hankey et al. |
| 2011/0253520 A1 | 10/2011 | Lim |
| 2012/0052271 A1 | 3/2012 | Gomez et al. |
| 2012/0176760 A1 | 7/2012 | Cohen et al. |
| 2012/0206669 A1 | 8/2012 | Kim |
| 2012/0236526 A1 | 9/2012 | Weber |
| 2012/0250273 A1 | 10/2012 | Kuo |
| 2012/0327325 A1 | 12/2012 | Park et al. |
| 2013/0128434 A1 | 5/2013 | Yamamoto et al. |
| 2013/0236699 A1 | 9/2013 | Prest et al. |
| 2014/0116090 A1 | 5/2014 | Lee et al. |
| 2014/0151320 A1 | 6/2014 | Chang et al. |
| 2014/0272298 A1 | 9/2014 | Memering et al. |
| 2014/0285956 A1 | 9/2014 | Russell-Clarke et al. |
| 2014/0311882 A1 | 10/2014 | Terashita |
| 2015/0002993 A1 | 1/2015 | Lee |
| 2015/0030834 A1 | 1/2015 | Morey et al. |
| 2015/0030859 A1 | 1/2015 | Rogers et al. |
| 2015/0044445 A1 | 2/2015 | Garner et al. |
| 2015/0077830 A1 | 3/2015 | Lin et al. |
| 2015/0093581 A1 | 4/2015 | Murata et al. |
| 2015/0104618 A1 | 4/2015 | Hayashi et al. |
| 2015/0122406 A1 | 5/2015 | Fisher et al. |
| 2015/0163382 A1 | 6/2015 | Kwong et al. |
| 2015/0165548 A1 | 6/2015 | Marjanovic et al. |
| 2015/0202854 A1 | 7/2015 | Tsuchiya et al. |
| 2015/0212247 A1 | 7/2015 | Borrelli et al. |
| 2015/0232366 A1 | 8/2015 | Fredholm et al. |
| 2015/0241732 A1 | 8/2015 | Kim et al. |
| 2015/0245514 A1 | 8/2015 | Choung |
| 2015/0274572 A1 | 10/2015 | Wada et al. |
| 2015/0299036 A1 | 10/2015 | Ukrainczyk et al. |
| 2016/0028931 A1 | 1/2016 | Kwong et al. |
| 2016/0137550 A1 | 5/2016 | Murata et al. |
| 2016/0224142 A1 | 8/2016 | Yang et al. |
| 2016/0270247 A1 | 9/2016 | Jones et al. |
| 2016/0357294 A1 | 12/2016 | Czeki et al. |
| 2016/0377768 A1 | 12/2016 | Wilson et al. |
| 2017/0027068 A1 | 1/2017 | Dane et al. |

(56) References Cited

U.S. PATENT DOCUMENTS

| | | |
|---|---|---|
| 2017/0059749 A1 | 3/2017 | Wakatsuki et al. |
| 2017/0066223 A1 | 3/2017 | Notsu et al. |
| 2017/0282503 A1 | 10/2017 | Peng et al. |
| 2017/0300114 A1 | 10/2017 | Matsuyuki et al. |
| 2017/0305788 A1 | 10/2017 | Nikulin |
| 2017/0334770 A1 | 11/2017 | Luzzato et al. |
| 2017/0340518 A1 | 11/2017 | Logunov et al. |
| 2017/0364172 A1 | 12/2017 | Kim et al. |
| 2018/0009697 A1 | 1/2018 | He et al. |
| 2018/0024274 A1 | 1/2018 | Rogers et al. |
| 2018/0067212 A1 | 3/2018 | Wilson et al. |
| 2018/0086026 A1 | 3/2018 | Nguyen et al. |
| 2018/0086663 A1 | 3/2018 | Luzzato et al. |
| 2018/0088399 A1 | 3/2018 | Fukushi et al. |
| 2018/0125756 A1 | 5/2018 | Gerrish et al. |
| 2018/0126704 A1 | 5/2018 | Zhang et al. |
| 2018/0134606 A1 | 5/2018 | Wagner et al. |
| 2018/0154615 A1 | 6/2018 | Dohn et al. |
| 2018/0237325 A1 | 8/2018 | Li et al. |
| 2018/0282207 A1 | 10/2018 | Fujii et al. |
| 2018/0304588 A1 | 10/2018 | Harris et al. |
| 2018/0304825 A1 | 10/2018 | Mattelet et al. |
| 2018/0326704 A1 | 11/2018 | Harris et al. |
| 2018/0370843 A1 | 12/2018 | Gross et al. |
| 2019/0022979 A1 | 1/2019 | Luzzato et al. |
| 2019/0030861 A1 | 1/2019 | Bellman et al. |
| 2019/0033144 A1* | 1/2019 | Andrews .............. G01N 33/386 |
| 2019/0037690 A1 | 1/2019 | Wilson et al. |
| 2019/0134944 A1 | 5/2019 | Dawson-Elli |
| 2019/0160787 A1 | 5/2019 | Bartlow et al. |
| 2019/0161402 A1 | 5/2019 | Harris et al. |
| 2019/0169060 A1 | 6/2019 | Jones et al. |
| 2019/0177215 A1* | 6/2019 | Jin ........................ G06K 9/0004 |
| 2019/0219463 A1* | 7/2019 | Orihara .................. G01N 21/21 |
| 2019/0263708 A1 | 8/2019 | Bookbinder et al. |
| 2019/0293838 A1 | 9/2019 | Haba et al. |
| 2020/0014780 A1 | 1/2020 | Jones et al. |
| 2020/0039186 A1 | 2/2020 | Yuan et al. |
| 2020/0055281 A1 | 2/2020 | Yoon et al. |
| 2020/0095159 A1 | 3/2020 | Marshall et al. |
| 2020/0301527 A1 | 9/2020 | Poole et al. |
| 2020/0323440 A1 | 10/2020 | Vule et al. |
| 2020/0339472 A1 | 10/2020 | Yoon et al. |
| 2020/0346525 A1 | 11/2020 | Mannheim Astete et al. |
| 2020/0369560 A1 | 11/2020 | Takeda et al. |
| 2020/0407266 A1 | 12/2020 | Suzuki et al. |
| 2021/0009469 A1 | 1/2021 | Marshall et al. |
| 2021/0014992 A1 | 1/2021 | Limarga et al. |
| 2021/0016547 A1 | 1/2021 | Bartlow et al. |
| 2021/0033757 A1 | 2/2021 | Wilson et al. |
| 2021/0072789 A1 | 3/2021 | Rogers et al. |
| 2021/0303031 A1 | 9/2021 | Poole et al. |
| 2021/0361233 A1 | 11/2021 | Wilson et al. |
| 2022/0009823 A1 | 1/2022 | Dejneka et al. |
| 2022/0117094 A1 | 4/2022 | Prest et al. |
| 2022/0193825 A1 | 6/2022 | Van Dyke et al. |
| 2022/0194840 A1 | 6/2022 | Meschke et al. |
| 2022/0194841 A1 | 6/2022 | Meschke et al. |
| 2023/0014168 A1 | 1/2023 | Poole et al. |

FOREIGN PATENT DOCUMENTS

| | | |
|---|---|---|
| CN | 104837781 | 8/2015 |
| CN | 105765722 | 7/2016 |
| CN | 106007345 | 10/2016 |
| CN | 106341962 | 1/2017 |
| CN | 106485275 | 3/2017 |
| CN | 108017263 | 5/2018 |
| CN | 108545917 | 9/2018 |
| CN | 108600419 | 9/2018 |
| CN | 108632510 | 10/2018 |
| CN | 110857865 | 3/2020 |
| CN | 111655478 | 9/2020 |
| CN | 215010334 | 12/2021 |
| DE | 102016107630 | 10/2017 |
| JP | S6042176 | 9/1985 |
| JP | S6271215 | 5/1987 |
| JP | H03122036 | 5/1991 |
| TW | 201912602 | 4/2019 |
| WO | WO2010/077845 | 7/2010 |
| WO | WO2012/027660 | 3/2012 |
| WO | WO2012/074983 | 6/2012 |
| WO | WO2014/022356 | 2/2014 |
| WO | WO2014/022681 | 2/2014 |
| WO | WO2015/031420 | 3/2015 |
| WO | WO2015/095089 | 6/2015 |
| WO | WO2016/065118 | 4/2016 |
| WO | WO2017/196800 | 11/2017 |
| WO | WO2019/199791 | 10/2019 |
| WO | WO2019213364 | 11/2019 |

OTHER PUBLICATIONS

Bourhis, "Production Control of Residual Stresses," Glass Mechanics and Technology, Second Edition, pp. 236-243, 2014.

Decourcelle, et al., "Controlling Anisotropy," Conference Proceedings, All Eyes on Glass, Glass Performance Days, Tampere, Finland, Jun. 28-30, 2017.

Mao et al., "Fabrication and characterization of 20 nm planar nanofluidic channels by glass-glass and glass-silicon bonding," www.rsc.org/loc, 8 pages, Jun. 30, 2005.

Moriceau et al., "Overview of recent direct wafer bonding advances and applications," Advances in Natural Sciences: Nanoscience and Nanotechnology, vol. 1, No. 043004, 11 pages, 2010.

Dudutis et al., Bessel beam asymmetry control for glass dicing applications, Procedia CIRP 74, pp. 333-338, 2018.

Jenne et al., "High-quality Tailored-edge Cleaving Using Aberration-corrected Bessel-like Beams," arXiv:2010.10226v1 [physics.optics], May 8, 2018.

Ungaro et al., "Using phase-corrected Bessel beams to cut glass substrates with a chamfered edge," Applied Optics, vol. 60, No. 3, p. 714, Dec. 10, 2020.

Author Unknown, "Handbook for Interior Designers," 3 pages, 1998.

* cited by examiner

EVALUATION OF TRANSPARENT COMPONENTS FOR ELECTRONIC DEVICES

CROSS-REFERENCE TO RELATED APPLICATION(S)

This application is a non-provisional patent application and claims the benefit of U.S. Provisional Patent Application No. 62/872,131, filed Jul. 9, 2019 and titled "Evaluation of Transparent Components for Electronic Devices," the disclosure of which is hereby incorporated by reference in its entirety.

FIELD

The described embodiments relate generally to evaluation of transparent components for electronic devices. More particularly, the present embodiments relate to evaluation of chemically strengthened transparent components which include a geometric feature such as an opening.

BACKGROUND

Electronic device enclosures may include metal, plastic or glass parts. Enclosure parts with resistance to scratching and/or impact can provide durability to the enclosure. In some cases, glass enclosure parts, such as a cover glass, may be chemically strengthened in order to improve their durability. The techniques, systems, and devices described herein are directed to evaluating chemically strengthened transparent components for electronic device enclosures.

SUMMARY

Methods for evaluating a chemically strengthened transparent component for an electronic device are disclosed herein. The transparent component may be a glass cover member or another glass component of the enclosure. The methods disclosed herein may allow non-destructive estimation of one or more stress levels in the transparent component produced by chemical strengthening. The methods may also be used to evaluate an overall level of chemical strengthening of the transparent component. Systems suitable for use with the methods are also disclosed.

The methods disclosed herein are particularly suited for evaluating a transparent component including an opening or other geometric feature which modifies the chemical strengthening of the transparent component. The opening or other geometric feature can lead to non-uniformity of the residual stresses resulting from chemical strengthening. The non-uniformity of the residual stresses in the transparent component can produce one or more optical effects under certain lighting and/or viewing conditions (e.g., when viewed with polarized light).

The methods described herein may allow estimation of a localized stress level in the vicinity of the opening or other geometric feature and/or a localized stress level away from the opening or other geometric feature. In some cases, the localized stress level in the vicinity of an opening may be greater than a localized stress level away from the opening. As an example, the localized stress level in the vicinity of the opening may be equal to the product of the localized stress level away from opening and a stress multiplier value. The stress multiplier value may depend on a shape of the geometric feature. In some cases, the stress multiplier value may depend on a curvature value of the geometric feature.

The methods disclosed herein use non-destructive optical techniques to assess one or more localized stress levels in the chemically strengthened transparent component. In some cases, the optical technique forms an image of the chemically strengthened transparent component and an intensity or other optical property of a given region of the image relates to the localized stress level in a corresponding portion of the transparent component. In some examples, one or more color values of a given region of the image can relate to the localized stress level in the corresponding portion of the transparent component.

In some cases, determining the localized stress level in one portion of the transparent component can allow estimation of the localized stress level in another portion of the transparent component. For example, determining the localized stress level of a portion of the transparent component near a geometric feature (e.g., an opening) can allow estimation of another portion of the transparent component (e.g., away from the geometric feature) by dividing the determined localized stress level by a stress multiplier value determined for the geometric feature. As another example, determining the localized stress level of a portion of the transparent component away from the geometric feature can allow estimation of a portion of the transparent component near the geometric feature by multiplying the determined localized stress level by a stress multiplier value for the geometric feature.

In some embodiments, the disclosure provides a method of estimating a chemical strengthening level of a glass cover member of an electronic device. The method comprises directing polarized light through the glass cover member, through a polarization analyzer, and onto a sensor to produce at least one optical measurement of the glass cover member. The method further comprises determining a differential intensity value from at least one optical measurement of a first portion and a second portion of the glass cover member, the first portion at least partially defining a curved boundary of an opening in the glass cover member and the second portion located away from the opening. The method further comprises estimating a localized stress level of the first portion based on the differential intensity value, obtaining an estimate of a curvature of the curved boundary, determining a stress multiplier value based on the estimate of the curvature, and estimating a chemical strengthening level of the glass cover member based on the localized stress level and the stress multiplier value.

The disclosure also provides a method of estimating a stress level in a chemically strengthened glass cover member. The method comprises forming an interference pattern by passing polarized light through the chemically strengthened glass cover member and through a polarization analyzer. The method further comprises receiving the interference pattern at a light sensor and analyzing the interference pattern. The analyzing comprises determining an intensity value corresponding to a first portion of the chemically strengthened glass cover member, the first portion at least partially defining a curved boundary of an opening in the chemically strengthened glass cover member and estimating a first localized stress level of the first portion based on the intensity value. The method further comprises estimating a stress multiplier value based on a curvature of the curved boundary and estimating a second localized stress level of a second portion of the chemically strengthened glass cover member, the second portion located away from the opening and the operation of estimating the second localized stress level being based on the first localized stress level and the stress multiplier value.

The disclosure also provides a system for estimating a stress level in a glass cover member. The system comprises a first optical inspection unit comprising a first light source, a first image sensor, and a first processor. The first optical inspection unit is configured to produce a first image of at least a first region of a glass cover member using the first light source and the first image sensor, the first region including an opening defined by the glass cover member. The first optical inspection unit is further configured to determine a curvature value of the opening from the first image using the first processor. The system further comprises a second optical inspection unit comprising a second light source, a polarizer, a polarization analyzer, a second image sensor, and a second processor. The second optical inspection unit is configured to produce polarized light using the second light source and the polarizer and direct the polarized light through at least a second region of the glass cover member, through the polarization analyzer, and onto the second image sensor, thereby forming a second image of at least the second region of the glass cover member. In addition, the second optical inspection unit is configured to determine a first intensity value of the second image using the second processor, the first intensity value corresponding to a first portion of the glass cover member, the first portion at least partially defining a curved boundary of the opening in the glass cover member, and determine a second intensity value of the second image using the second processor, the second intensity value corresponding to a second portion of the glass cover member and the second portion located away from the opening. The system further comprises a computing system comprising a memory containing instructions; and a third processor. The third processor is configured to execute the instructions and thereby cause the computing system to perform operations including receiving the curvature value from the first optical inspection unit, estimating a stress multiplier value based on the curvature value, estimating a localized stress level in the first portion of the glass cover member based on a difference between the first intensity value and the second intensity value, and estimating a chemical strengthening level of the glass cover member based on the localized stress level and the stress multiplier value.

BRIEF DESCRIPTION OF THE DRAWINGS

The disclosure will be readily understood by the following detailed description in conjunction with the accompanying drawings, wherein like reference numerals designate like elements.

Figure 1A:
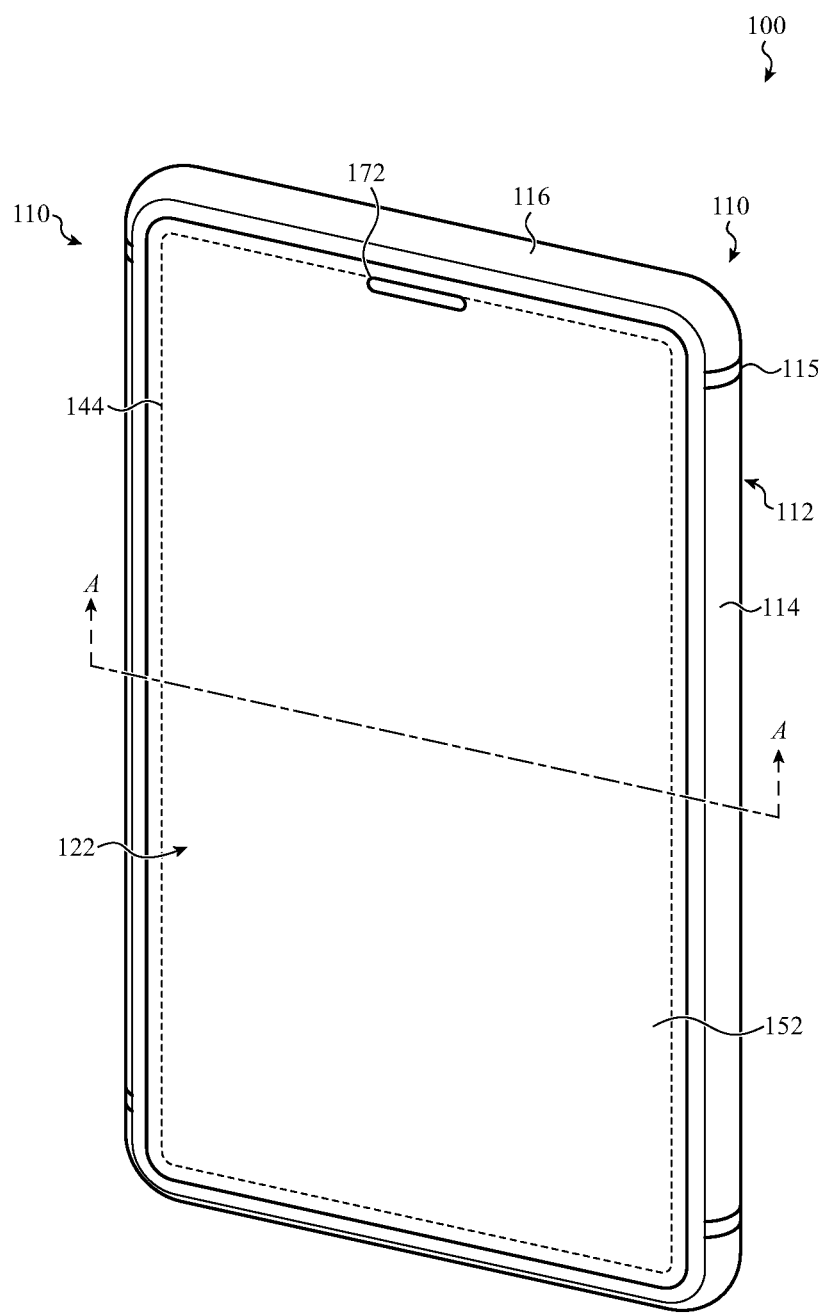
FIG. 1A shows a front view of an example electronic device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

The following disclosure relates to methods for evaluating a chemically strengthened transparent component for an electronic device. The transparent component may be a glass cover member, another glass component, or a glass ceramic component of the enclosure. The non-destructive optical methods disclosed herein can be used to assess whether a chemical strengthening level of the transparent component falls within an acceptable range. The ability to identify and reject unacceptably chemically strengthened components can help control the quality of the assembled electronic devices. In addition, the ability to identify a transparent component having a chemical strengthening level outside the acceptable range can improve control of the chemical strengthening process.

In embodiments described herein the chemically strengthened transparent component includes non-uniform residual stresses due at least in part to an opening or other geometric feature in the transparent component. The non-uniformity of the residual stresses in the transparent component can produce one or more optical effects under certain lighting and/or viewing conditions. For example, the transparent component may reflect polarized light non-uniformly and produce an optical effect conventionally referred to as (optical) anisotropy or iridescence. In some cases, the methods disclosed herein can be used to predict the amount of optical anisotropy or iridescence produced under particular viewing conditions.

In addition, the methods disclosed herein can be used to determine residual stress levels in the transparent component. In some cases, the methods disclosed herein can determine whether a localized stress level near an opening or other geometric feature of the transparent component is unacceptably high. If the localized stress level in the transparent component is unacceptably high near the geometric feature, a level of chemical strengthening near the geometric feature may be unacceptably high and this portion of the transparent component may be more susceptible to some forms of damage. In addition, the methods disclosed herein may be used to determine whether a localized stress level away from the opening or other geometric feature is unacceptably low. If the localized stress level in the transparent component is unacceptably low, the transparent component may be susceptible to cracking.

Estimates of a localized stress level at one or more locations of the transparent component may be determined at least in part using a photoelastic technique. The residual stresses within the transparent component due to the chemical strengthening process typically cause stress birefringence. As a result, polarized light transmitted through or reflected from the transparent component may be used to form a photoelastic pattern, which may be an interference pattern. In some cases, the methods disclosed herein form an image of the transparent component. One or more intensity values of the image may be measured in order to determine one or more localized stress levels in the transparent component. The estimates of the one or more localized stress levels may in turn be used to estimate a level of chemical strengthening of the transparent component.

In some cases, the disclosure describes methods and systems used to evaluate glass components. The disclosure provided herein with respect to methods and systems used to evaluate glass components may also be applicable to other types of ion-exchangeable transparent components. For example, the disclosure provided herein may also be applicable to ion-exchangeable glass ceramic components or components including an ion-exchangeable glass and an ion-exchangeable glass ceramic.

These and other embodiments are discussed below with reference to FIGS. 1A-13. However, those skilled in the art will readily appreciate that the detailed description given herein with respect to these figures is for explanatory purposes only and should not be construed as limiting.

FIG. 1A shows a front view of an example electronic device 100 including a glass component. The electronic device 100 may be a mobile telephone (also referred to as a mobile phone). In additional embodiments, the electronic device 100 may be a notebook computing device (e.g., a notebook), a tablet computing device (e.g., a tablet), a portable media player, a wearable device, or another type of portable electronic device. The electronic device 100 may also be a desktop computer system, computer component, input device, appliance, or virtually any other type of electronic product or device component.

As shown in FIG. 1A, the electronic device 100 has an enclosure 110 including a cover assembly 122. The cover assembly 122 may include a glass component in the form of a glass cover member 152 (also shown in FIG. 1C). The cover assembly 122 may also include one or more coatings on the glass cover member 152, such as a smudge-resistant coating on an exterior surface of the glass cover member 152. The description provided herein with respect to examples of glass cover members (e.g., glass cover member 152) applies more generally to other types of glass enclosure components and other types of ion-exchangeable transparent enclosure components.

Figure 2:
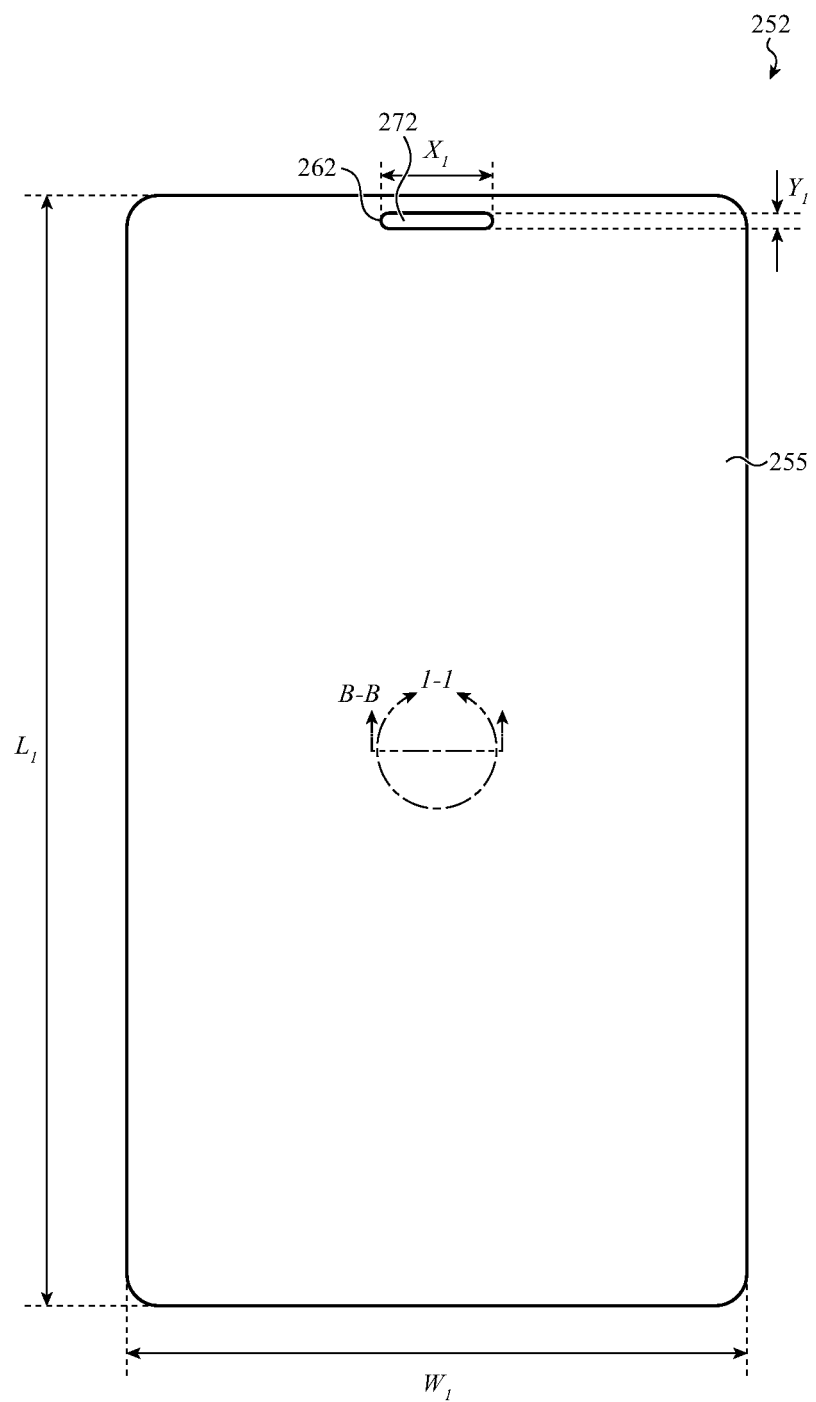
FIG. 2 shows an example of a glass cover member having an opening.
Figure 3:
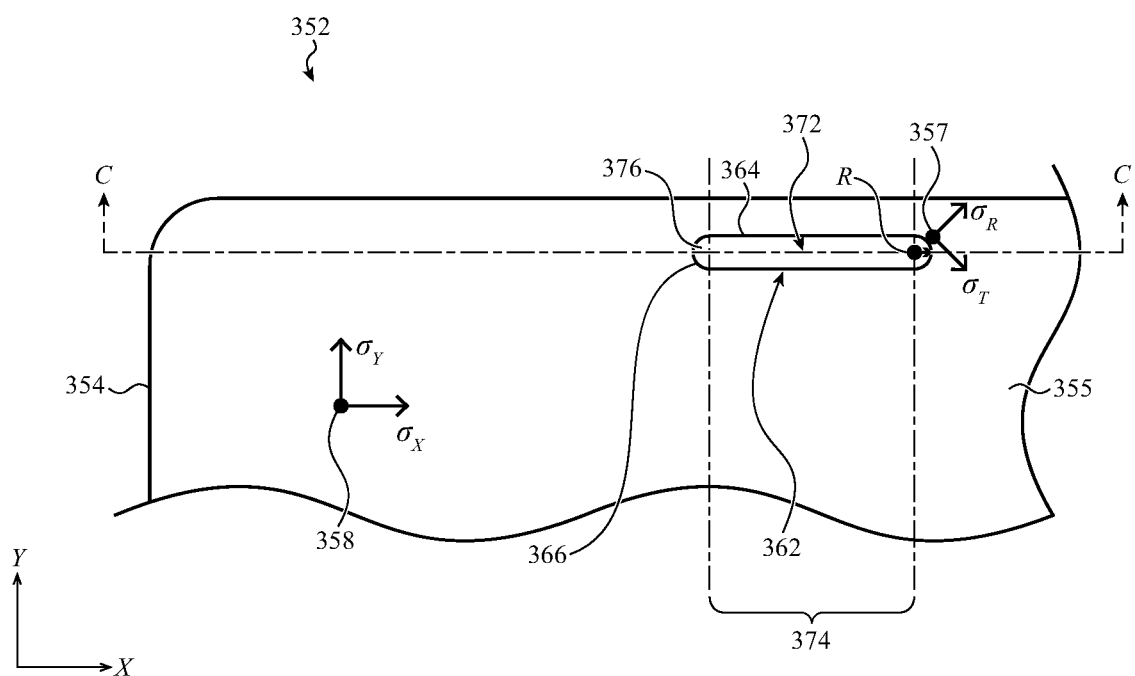
FIG. 3 shows a detail view of a glass cover member having an opening.
Figure 4:
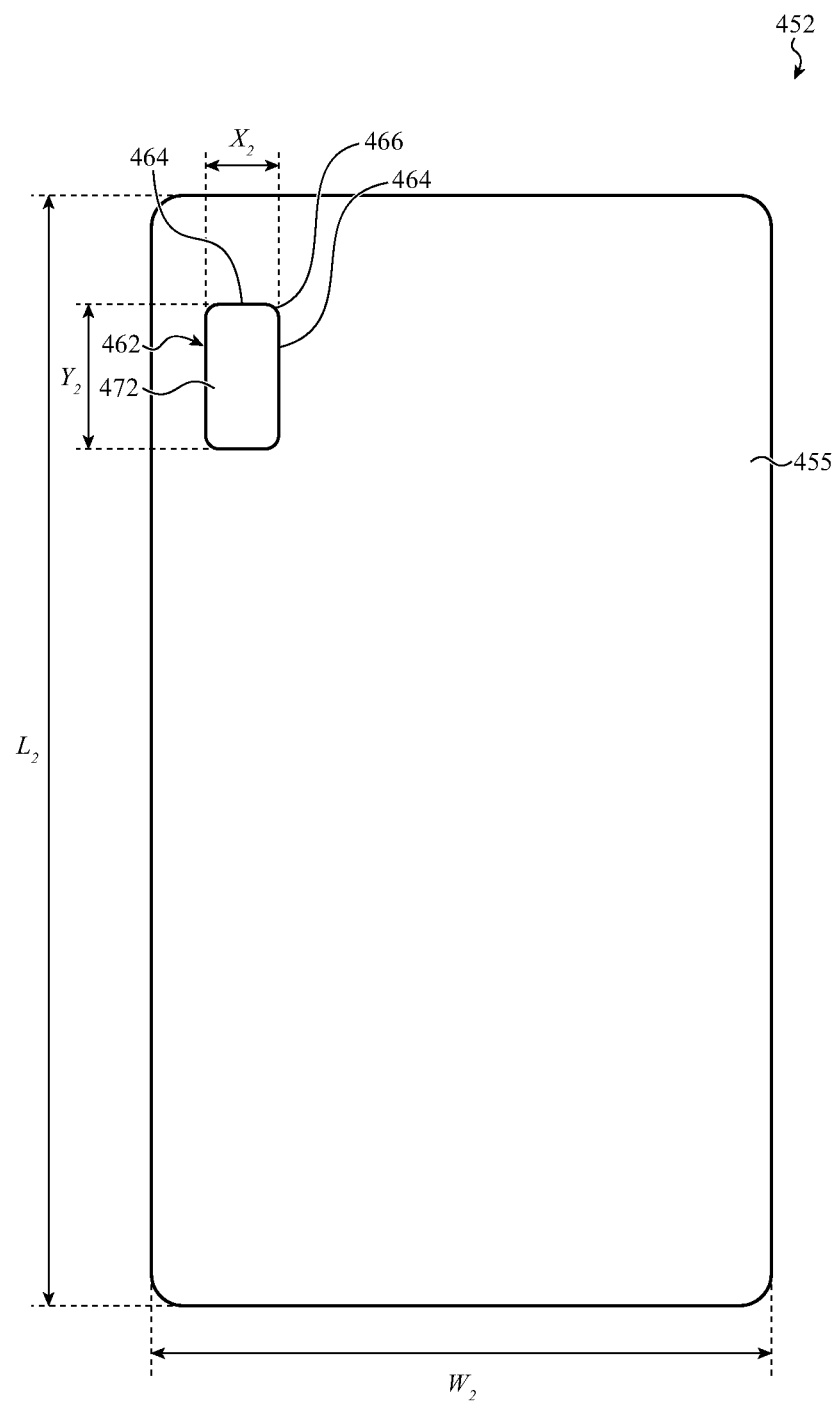
FIG. 4 shows another example of a glass cover member having an opening.

As shown in FIG. 1A, the glass cover member 152 defines an opening 172 (which may also be referred to as a hole). In general, an opening may be provided in the glass cover member 152 or other transparent component to facilitate input to or output from a device component such as a microphone, a camera component, and the like. In the example of FIG. 1A, the opening 172 may provide a speaker port for an earpiece of the electronic device 100. Examples of openings are discussed in further detail with respect to FIGS. 2-4. The description provided with respect to FIGS. 2-4 is generally applicable herein and, for brevity, is not repeated here.

Figure 5:
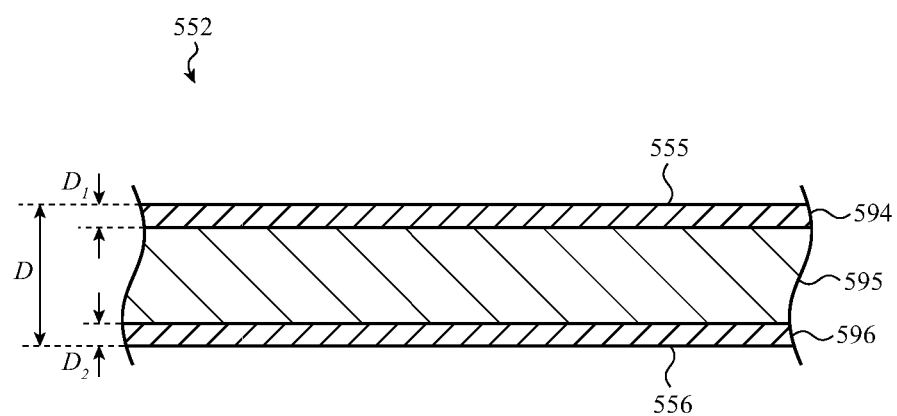
FIG. 5 shows an example cross-section view of a glass cover member.
Figure 6:
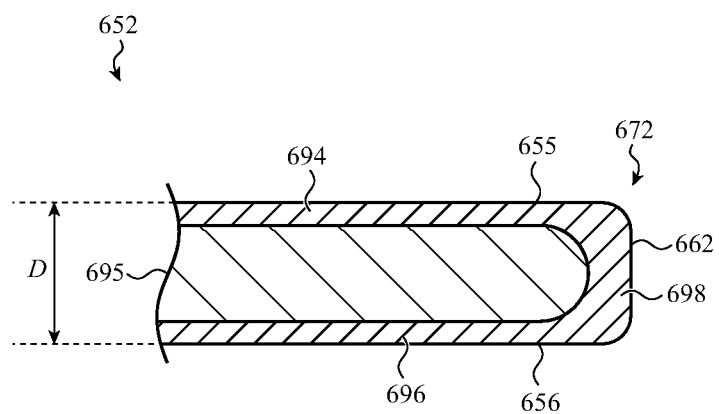
FIG. 6 shows another example cross-section view of a glass cover member.

The glass cover member 152 is typically chemically strengthened through ion exchange. Chemical strengthening of glass cover members is described in further detail with respect to FIGS. 3, 5, and 6. The description provided with respect to FIGS. 3, 5, and 6 is generally applicable herein and, for brevity, is not repeated here. For brevity, a chemically strengthened glass component such as a chemically strengthened glass cover member may simply be referred to herein as a glass component or glass cover member.

In some embodiments the cover assembly 122 may be described as a glass cover. More generally, the cover assembly 122 may be formed from multiple layers. For example, a multilayer cover assembly may include one or more glass cover members, glass ceramic cover members, composite cover members including a glass and a glass ceramic, polymer cover members, and/or various coatings and layers. In some cases, a cover member may take the form of a sheet. As examples, a coating or layer of a cover assembly may include a smudge-resistant layer, an anti-reflective layer, a decorative layer on an interior surface of a cover member, an adhesive layer, or a combination thereof.

Typical cover assemblies herein are thin, typically less than 5 mm in thickness, and more typically less than 3 mm in thickness. In some aspects, a glass cover member (or other cover member) included in a cover assembly can have a thickness from about 0.1 mm to 2 mm, from 0.5 mm to 2 mm, or from 0.2 mm to 1 mm.

Figure 1B:
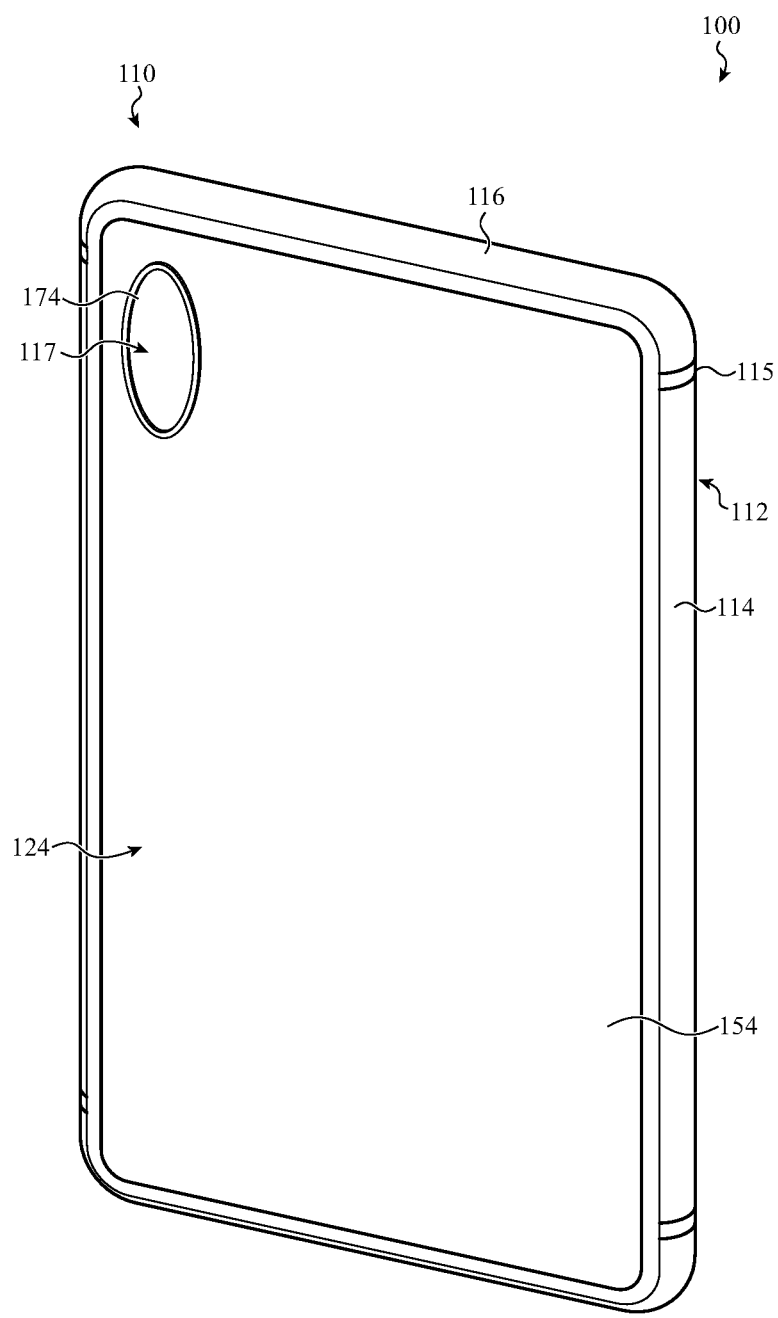
FIG. 1B shows an example of a rear view of the electronic device of FIG. 1A.
Figure 1C:
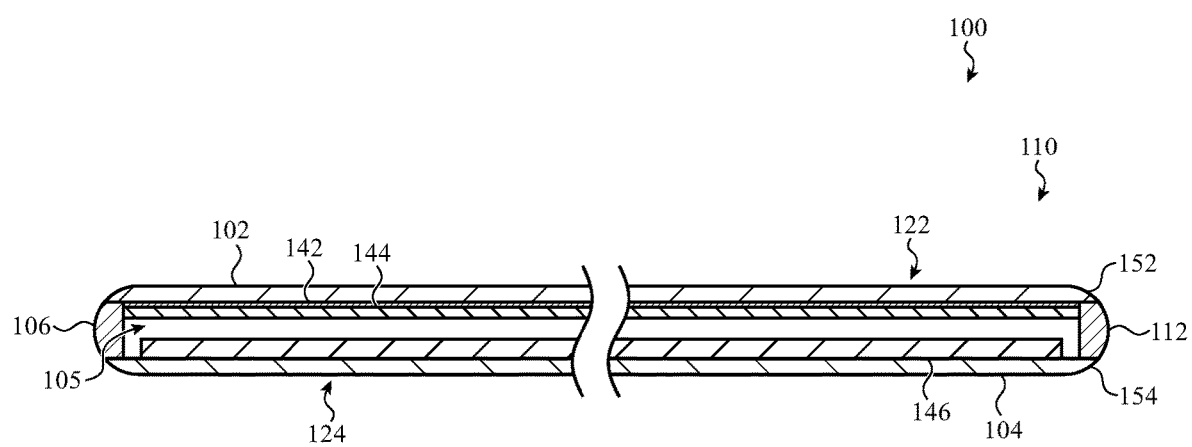
FIG. 1C shows an example of a cross-section view of the electronic device of FIGS. 1A and 1B.

The cover assembly 122 may at least partially define a front surface 102 of the electronic device 100 (see FIG. 1C). The cover assembly 122 is positioned over the display 144 and may define a transparent portion positioned over the display 144 (indicated by the dashed line in FIG. 1A). The enclosure 110 may at least partially surround the display 144.

As shown in FIG. 1A, the enclosure 110 further includes a housing 112 (which may also be referred to as a housing member). The cover assembly 122 may be coupled to the housing 112. For example, the cover assembly 122 may be coupled to the housing 112 with an adhesive, a fastener, an engagement feature, or a combination thereof. The housing 112 may be formed from a metal, a glass, a ceramic, a plastic, or a combination thereof.

The housing 112 may at least partially define a side surface 106 of the electronic device 100 (see FIG. 1C). Generally, a housing 112 may include one or more metal members or one or more glass members. As shown in FIG. 1A, the housing 112 is formed from a series of metal segments (114, 116) that are separated by polymer or dielectric segments 115 that provide electrical isolation between adjacent metal segments. One or more of the metal segments (114, 116) may be coupled to internal circuitry of the electronic device 100 and may function as an antenna for sending and receiving wireless communication.

FIG. 1B shows an example of a rear view of the electronic device 100 of FIG. 1A. The enclosure 110 further includes a cover assembly 124. The cover assembly 124 defines a rear surface 104 of the electronic device 100 (see FIG. 1C). The enclosure 110, the housing 112, the metal segments 114 and 116, and the polymer or dielectric segments 115 are as previously described for FIG. 1A.

The cover assembly 124 may include a glass cover member 154. As shown in FIG. 1B, glass cover member 154 includes an opening 174 configured to surround a window 117 and one or more camera assemblies may be placed below the window 117. In other embodiments, the glass cover member 154 may not include an opening or may include multiple openings.

FIG. 1C shows an example of a cross-section view of the electronic device 100 of FIGS. 1A and 1B. The cross-section may be taken along A-A of FIG. 1A. As previously described, the enclosure 110 of the electronic device 100 includes the cover assembly 122 at the front and the cover assembly 124 at the rear of the electronic device 100.

The electronic device 100 further includes a display 144 and a touch sensor 142 provided below the front cover assembly 122. The display 144 may be a liquid-crystal display (LCD), a light-emitting diode (LED) display, an LED-backlit LCD display, an organic light-emitting diode (OLED) display, an active layer organic light-emitting diode (AMOLED) display, and the like. The touch sensor 142 may be configured to detect or measure a location of a touch along the exterior surface of the front cover assembly 122. Touch sensors and displays are described in more detail below with respect to FIG. 13 and that description is generally applicable herein.

As shown in FIG. 1C, the cover assembly 122 defines a front surface 102 and the cover assembly 124 defines a rear surface 104 of the electronic device 100. The housing 112 may at least partially define a side surface 106 of the electronic device 100. The housing 112 may also at least partially define a side wall of the electronic device, the side wall at least partially enclosing the internal cavity 105.

As previously described with respect to FIG. 1B, a window 117 may be positioned within an opening 174 formed in a glass cover member and a camera assembly positioned below the window 117. As schematically shown in FIG. 1C, additional components 146 may also be included within the interior volume 105 of the electronic device 100. These additional components may comprise one or more of a processing unit, control circuitry, memory, an input/output device, a power source, a network communication interface, an accessory, and a sensor. Components of a sample electronic device are described in more detail below with respect to FIG. 13 and that description is generally applicable herein.

FIG. 2 shows an example of a glass cover member 252 defining an opening 272. Typically the opening 272 extends through a thickness of the glass cover member 252. As shown in FIG. 2, an exterior surface 255 of the glass cover member 252 defines a rectangular shape with rounded corners. The rectangular shape has a length $L_1$ and width $W_1$, with the length $L_1$ being longer than the width $W_1$. The opening 272 is positioned so a longitudinal axis of the opening is aligned with the width $W_1$ of the rectangular shape.

As shown in FIG. 2, the glass cover member 252 defines a boundary 262 of the opening 272. The shape of the boundary 262 defines a shape of the opening 272. As shown in FIG. 2, at least a portion of the boundary 262 is curved and the curved portion is located along an end of the opening (also referred to herein as an end portion). For example, the boundary 262 may define a stadium shape at the external surface 255 of the glass cover member 252. The opening 272 has a length $X_1$ and a height $Y_1$, and is elongated, with the length $X_1$ being greater than the height $Y_1$. As shown in FIG. 2, the length $X_1$ is aligned with the width $W_1$ of the glass cover member 252. In additional examples, a length or diameter of an opening may be aligned with or angled with respect to a length or width of the glass cover member 252. Additional description of features of the opening 272 is provided with respect to the detail view of FIG. 3 and, for brevity, is not repeated here.

It should be understood that the shape of the opening 272 is not limited to the example of FIG. 2, but may be any shape suitable for its intended purpose. For example, an opening 272 may have a shape at the exterior surface 255 of the glass cover member 252 which is circular, oval, a rounded square (a square with rounded corners), a rounded rectangle, and the like.

In addition, the shape of the glass cover member 252 is not limited to the example of FIG. 2, but may be any shape suitable for its intended purpose. Although the glass cover member 252 is shown in FIG. 2 as being substantially planar, the principles described herein also relate to glass components and glass cover members including one or more curved surfaces. In embodiments, a glass component such as a glass cover member may be three-dimensional. For example, the glass component may define a peripheral portion that is not coplanar with respect to a central portion. The peripheral portion may, for example, define a side wall of a device housing or enclosure, while the central portion defines a front surface (which may define a transparent window that overlies a display).

The glass components described herein, such as glass cover member 252, may comprise a glass material. The glass material may be a metal oxide-based material such as a silica-based material. The glass material of the glass cover member may have a network structure, such as a silicate-based network structure. For example, the glass material may comprise an aluminosilicate glass or a boroaluminosilicate glass. As used herein, an aluminosilicate glass includes the elements aluminum, silicon, and oxygen, but may further include other elements. Similarly, a boroaluminosilicate glass includes the elements boron, aluminum, silicon, and oxygen, but may further include other elements.

The glass material may be ion-exchangeable. For example, an aluminosilicate glass or a boroaluminosilicate glass may further include monovalent or divalent ions which compensate charges due to replacement of silicon ions by aluminum ions. Suitable monovalent ions include, but are not limited to, alkali metal ions such as $Li^+$, $Na^+$, or $K^+$. Suitable divalent ions include alkaline earth ions such as $Ca^{2+}$ or $Mg^{2+}$. The glass material of the glass cover member may be ion exchangeable.

FIG. 3 shows a detail view of a glass cover member 352 having a boundary 362 which defines an opening 372. The opening 372 may be an example of the opening 272 of FIG. 2 and for brevity those details are not repeated here.

The boundary 362 may include boundary portions 364 set apart from each other and defining a central portion 374 of the opening. The boundary may also include boundary portions 366 defining end portions 376 of the opening 372.

The end portions 376 of the opening 372 are curved and may also be referred to herein as curved end portions 376. The central portion 374 of the opening extends between the two curved end portions 376. As shown in FIG. 3, the central portion 374 may define a "straight" portion (e.g., a rectilinear portion) of the opening 372.

As shown in FIG. 3, the portions 366 are curved portions of the boundary 362. Each of the curved portions 366 is located along an end portion 376 of the opening 372. The curved portions 366 may be described by a radius of curvature R (shown in the plane defined by the surface 355 of the glass cover member 352). In some cases, the curved portions 366 may have a substantially constant radius of curvature, so that the curved portions are semi-circular. In other cases, the curved portions 366 may be characterized by a minimum radius of curvature. The radius of curvature R may be less than or equal to 2 mm, less than or equal to 1.5 mm, less than or equal to 1 mm, less than or equal to 500 microns, from 100 microns to 1 mm, or from 50 microns to 500 microns. For simplicity, a curved portion 366 of the boundary 362 may also be referred to herein as a curved boundary.

As shown in FIG. 3, the boundary portions 364 have a curvature less than that of the curved boundary portions 366. In some embodiments, the boundary portions 364 may be substantially "straight" or rectilinear at the surface 355 of the glass cover member 352 (and planar in three dimensions).

Typically the glass cover member 352 is chemically strengthened as the result of one or more ion-exchange operations. Therefore, a chemically strengthened glass cover member may also be referred to herein as an ion-exchanged glass cover member. During the ion exchange operation, ions present in the glass material may be exchanged for larger ions in a region extending from a surface of the glass cover member. For example, an ion-exchangeable glass material may include monovalent or divalent ions such as alkali metal ions (e.g., $Li^+$, $Na^+$, or $K^+$) or alkaline earth ions (e.g., $Ca^{2+}$ or $Mg^{2+}$) which may be exchanged for other alkali metal or alkaline earth ions. If the glass member comprises sodium ions, the sodium ions may be exchanged for potassium ions. Similarly, if the glass member comprises lithium ions, the lithium ions may be exchanged for sodium ions and/or potassium ions. Similar ion-exchange processes may be used to chemically strengthen other types of ion-exchangeable transparent components, such as glass ceramic components.

The ion exchange operation typically creates residual stress in the glass cover member. For example, exchange of ions present in the glass material for larger ions may produce residual compressive stress within the ion-exchanged region extending from the surface of the glass cover member 352. A tensile stress region may also be formed within the glass cover member 352. Additional description of compressive stress and tensile stress regions formed within the glass cover member is provided with respect to FIGS. 5 and 6 and, for brevity, is not repeated here. In some cases, the residual stresses in the glass cover member 352 due to chemical strengthening can produce a double refraction effect which can be measured with an optical photoelastic technique.

The residual stresses due to ion exchange may be different in a portion 357 of the glass cover member 352 near the opening 372 than in a portion 358 of the glass cover member 352 away from the opening 372 (and the sides 354 of the glass cover member 352). In some cases, at least some of the residual stresses due to ion exchange may be greater at or near the curved end portions 376 of the opening than away from the opening 372. In such cases, the residual stresses may be viewed as being concentrated at or near the curved end portions 376.

The directions of the principal in-plane stresses may also be different in different portions of the glass cover member 352 as shown schematically in FIG. 3. At the portion 357 of the glass cover member 352 (near a curved portion 366 of the boundary 362), a principal stress $\sigma_R$ is in a radial direction and a principal stress $\sigma_T$ is in a tangential direction. The principal stress $\sigma_R$ may be zero at the boundary portion 366. At the portion 358 of the glass cover member 352, a principal stress $\sigma_X$ may be aligned with the x axis (e.g., aligned with the width $W_1$ of the glass cover member 252 as shown in FIG. 2) and a principal stress $\sigma_Y$ may be aligned with the y axis (e.g., aligned with the length $L_1$ of the glass cover member 252 as shown in FIG. 2).

Information about differences in stress states between different portions of the glass cover member 352 can be obtained using a photoelastic technique. In particular, the refractive index of a given portion of the glass cover member 352 (e.g., the portion 357 or the portion 358) may depend upon the stress state and the principal stress directions of that portion. Use of optical photoelastic techniques to obtain information about stress states of a glass cover member is described in more detail with respect to FIGS. 7-9 and, for brevity, that description is not repeated here.

FIG. 4 shows another example of a glass cover member 452 defining an opening 472. As shown in FIG. 4, an exterior surface 455 of the glass cover member 452 defines a rectangular shape with rounded corners. The rectangular shape has a length $L_2$ and width $W_2$.

The glass cover member 452 defines a boundary 462 around the opening 472. The opening 472 may have a shape at least partially defined by the shape of the boundary 462. As shown in FIG. 4, the boundary 462 and the opening 472 define a rounded rectangular shape (at the exterior surface 455). The opening 472 may have a width $X_2$ and a height $Y_2$. As shown in FIG. 4, the height $Y_2$ is greater than the width $X_2$ of the opening 472.

The boundary 462 may include portions 464 which largely define the sides of the rounded rectangular shape. The boundary 462 also includes rounded corner portions 466. The rounded corner portions may be described by a curvature (and a radius of curvature). As shown in FIG. 4, the boundary portions 464 have a curvature less than that of the rounded corner portions 466. In some embodiments, the boundary portions 464 may be substantially "straight" or rectilinear at the exterior surface 455 (and planar in three dimensions).

In some cases, the residual stresses due to ion exchange are different in a portion of the glass cover member 452 near the opening 472 than in a portion of the glass cover member 452 away from the opening 472. For example, at least some of the residual stresses due to ion exchange may be greater at or near the rounded corners 466 of the boundary 462 than away from the opening 472. In such cases, the residual stresses may be viewed as being concentrated at or near the rounded corners 466 of the boundary 462.

As previously described with respect to FIG. 2, the shape of the opening 472 and the shape of the glass cover member 452 are not limited to those shown in FIG. 4 and may be any of the shapes previously described with respect to FIG. 2. For brevity, that description is not repeated here.

FIG. 5 shows an example of a partial cross-section view of a glass cover member 552 and schematically illustrates residual stress regions formed in the glass cover member as a result of chemical strengthening. The cross-section of FIG.

5 may be located away from any openings in the glass cover member 552 and may be an example of a partial cross-section of glass cover member 252 of FIG. 2 (along line B-B and in detail area 1-1).

As shown in FIG. 5, a compressive stress region 594 extends from the exterior surface 555 and a compressive stress region 596 extends from the interior surface 556 of the glass cover member 552 (not shown to scale). A tensile stress region 595 is positioned between the compressive stress regions 594 and 596. The compressive stress regions 594 and 596 may have a biaxial compressive stress state. Compressive stress regions 594 and 596 may also be referred to herein as compressive stress layers and tensile stress region may also be referred to herein as a tensile stress layer. The compressive stress region 594 may have a depth $D_1$, the compressive stress region may have a depth $D_2$, and the glass cover member 552 may have a thickness D. In some cases, the depths $D_1$ and $D_2$ may be substantially equal. In other cases, the depths $D_1$ and $D_2$ may differ. For example, the depth $D_1$ may be greater than the depth $D_2$ to provide increased resistance to cracking at the exterior surface 555.

As previously discussed with respect to FIG. 3, the compressive stress regions 594 and 596 may be formed as a result of an ion exchange operation. The ion exchange may occur within a first ion-exchanged region extending from the exterior surface 555 and a second ion-exchanged region extending from the interior surface 556 of the glass cover member 552. The ion exchange leads to formation of compressive stress regions 594 and 596 within these ion-exchanged regions. The compressive stress regions 594 and 596 may be enriched in the larger ions as compared to the glass material in the tensile stress region 595. The ion exchange operation may take place at a temperature above room temperature but at a temperature below the strain point of the glass.

FIG. 6 shows another example cross-section view of a glass cover member 652 which schematically illustrates residual stress regions formed in the glass cover member 652 as a result of chemical strengthening. The cross-section of FIG. 6 may intersect an opening 672 in the glass cover member 652 and may be an example of a cross-section of glass cover member 352 along line C-C in FIG. 3. The boundary 662 defines the opening 672.

As shown in FIG. 6, the stress state near the opening 672 is different than the stress state shown in FIG. 5. As schematically shown in FIG. 6, a compressive stress region 694 extends from the exterior surface 655, a compressive stress region 696 extends from the interior surface 656, and a compressive stress region 698 extends from a boundary 662 of the glass cover member 652 (not shown to scale). A tensile stress region 695 is bounded, at least in part, by the compressive stress regions 694, 696, and 698. As schematically illustrated in FIG. 6, a portion of the glass cover member 652 near the boundary 662 may have a triaxial stress state. The compressive stress regions 694, 696, and 698 may be formed by an ion-exchange process as previously described for FIG. 5 and, for brevity, that description is not repeated here.

As previously discussed with respect to FIG. 3, the presence of the opening 672 may concentrate residual stress in the vicinity of the opening 672. The concentration of residual stress is schematically shown in FIG. 6 by the different depths of the compressive stress regions 694, 696, and 698. In the example of FIG. 6, the depth of the compressive stress region is greater at the boundary 662 and at the transition between the boundary 662 and the surfaces 655 and 656 than farther away from the boundary 662. A stress multiplier value may be used to characterize the stress concentration effect. A stress multiplier value may also be referred to herein as a stress concentration factor. The stress multiplier value may be estimated based on the geometry of the opening 672 (and the boundary 662). For example, a stress multiplier value at or near a curved end portion of the opening 672 may be estimated based on a curvature value (or a radius of curvature) of the corresponding curved portion of the boundary 662.

Other geometric features may also lead to a concentration of residual stress and a stress multiplier value may be estimated for these geometric features based on the geometry of these geometric features. For example, a stress multiplier for the opening shape of FIG. 4 may be based upon a curvature value (or a radius of curvature) at the rounded corners. Estimation of the stress multiplier value is discussed in further detail with respect to FIG. 9, and for brevity, that discussion is not repeated here.

As previously discussed, optical photoelastic techniques can be used to obtain information about stress states of a chemically strengthened glass cover member. In some cases, the optical photoelastic techniques include an operation of directing polarized light through the chemically strengthened glass cover member. Changes in the polarization of at least some of the light passing through the glass cover member can produce optical effects which can provide information about the stress states. The polarized light may directed through the chemically strengthened glass cover member in a direction aligned with the thickness of the chemically strengthened glass cover member.

Figure 7:
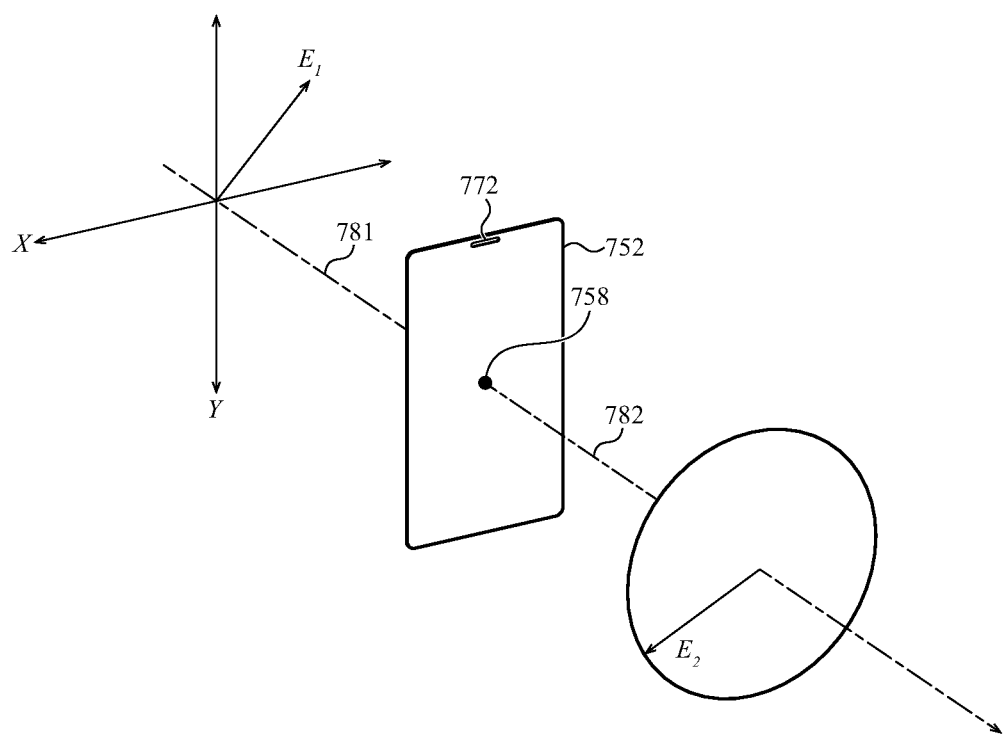
FIG. 7 schematically shows transmission of light through a chemically strengthened glass cover member.

FIG. 7 schematically illustrates a change in the polarization of light directed through a chemically strengthened glass cover member 752. In some cases, the light emerging from the chemically strengthened glass cover member 752 includes polarization components which are out of phase with each other. The change in the polarization of the light emerging from the chemically strengthened glass cover member 752 may result from stress birefringence (as previously discussed with respect to FIG. 3). For purposes of illustration, FIG. 7 shows transmission of a single ray of light through portion 758 of the glass cover member 752. The portion 758 is located away from the opening 772 in the glass cover member 752.

In the example of FIG. 7, a ray 781 is directed onto the glass cover member 752. The light from ray 781 is transmitted through a portion 758 of the glass cover member 752. The polarization of the ray 781 is modified as it is transmitted through the portion 758 and emerges from the glass cover member as ray 782. In the example of FIG. 7, the ray 781 is linearly polarized with polarization $E_1$ and the ray 782 is elliptically polarized with polarization $E_2$ due to the difference in phase.

The chemically strengthened glass cover member 752 may be an example of glass cover members 152, 252, 352, or any other glass cover members described herein and, for brevity, the description of these glass cover members is not repeated here.

Figure 8:
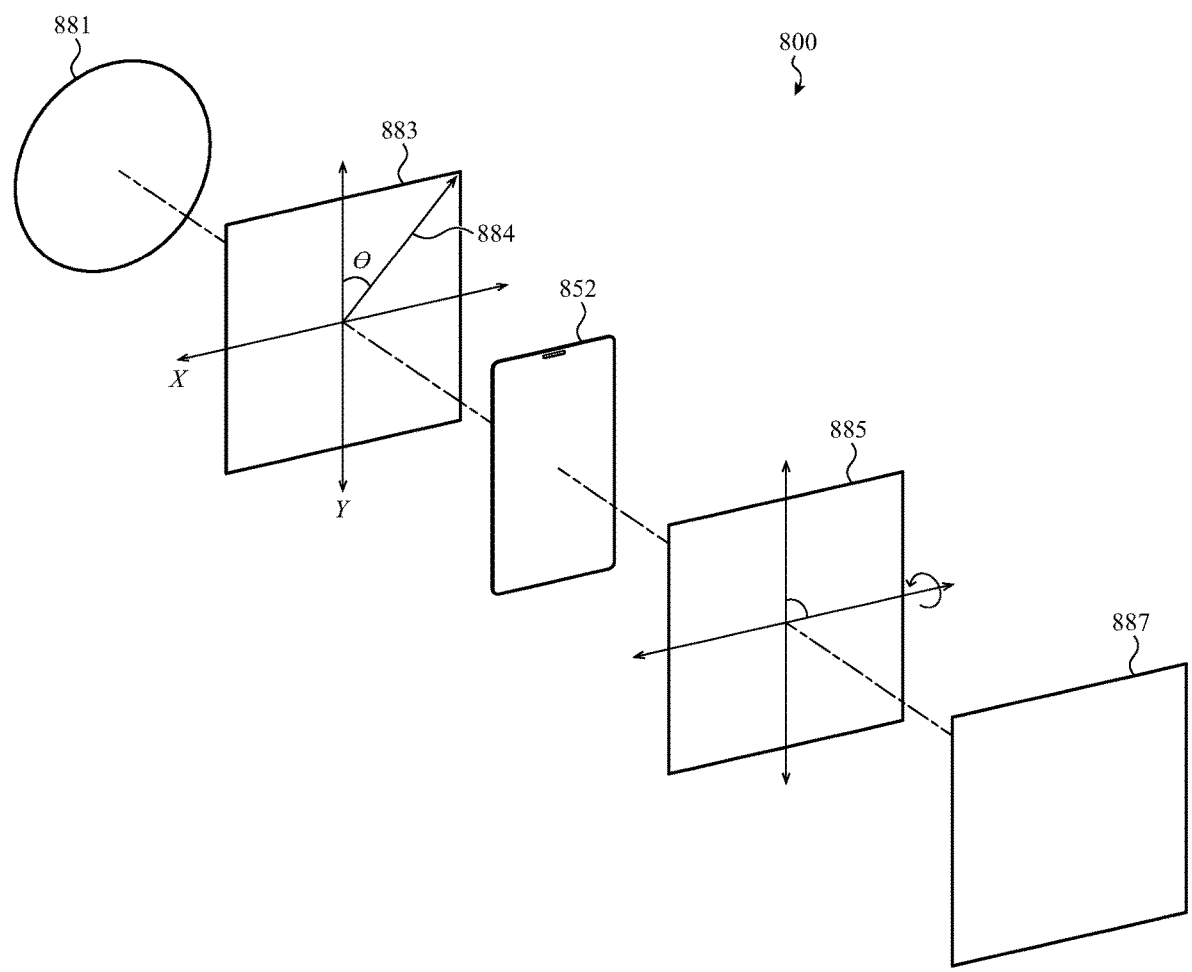
FIG. 8 schematically shows elements of an optical system for evaluating a chemically strengthened glass cover member.

The optical photoelastic techniques used herein may include directing polarized light through a polarization analyzer after directing the polarized light through the chemically strengthened glass cover member. However, in some cases polarized light reflected from the chemically strengthened glass cover member may be directed through the polarization analyzer. In these cases, a reflective backing may optionally be provided behind the chemically strengthened glass cover member. The light emerging from the polarization analyzer may be used to obtain information about the stresses present in the chemically strengthened glass cover member. For example, the light emerging from the polarization analyzer may be directed onto a sensor, as schematically illustrated in FIG. 8. One or more optical measurements provided by the sensor may then be used to obtain information about one or more stress states in the chemically strengthened glass cover member. When the light is reflected from the chemically strengthened glass cover, the optical measurement may effectively be an optical anisotropy measurement.

FIG. 8 schematically shows elements of an optical system 800 for evaluating a chemically strengthened glass cover member 852. Some or all of the elements of optical system 800 may be included in the system 1200 of FIG. 12. In the optical system of FIG. 8, polarized light is directed onto and through the chemically strengthened glass cover member 852, through a polarization analyzer 885, and onto a sensor 887. The optical system 800 further includes a light source 881 and a polarizer 883 for generating the polarized light. The polarized light may be directed onto and through a region of the chemically strengthened glass cover member 852. The region may be less than an entirety of the chemically strengthened glass cover member 852. The region may include a first portion and a second portion of the chemically strengthened glass cover member 852, with the first portion at least partially defining a geometric feature, such as an opening, of the chemically strengthened glass cover member 852

The optical system 800 includes a light source 881. The light source may predominantly produce light in a narrow band of wavelengths (e.g., a green fluorescent lamp) or may produce light essentially comprising a single wavelength (e.g., a laser). In addition, the light source may produce light covering a wider spectrum, such as the visible spectrum of light (e.g., a "white" fluorescent lamp). In some cases the light source may produce light in the form of a beam or one or more lenses may be used to form a beam from the light before it enters the chemically strengthened glass cover member. The beam may have a diameter or width greater than or equal to that of the glass cover member or of the regions(s) of the glass cover member to be analyzed. In other cases, the light entering the chemically strengthened glass cover member need not form a beam. For example, diffuse light may be directed onto the chemically strengthened glass cover member. The description provided herein with respect to light source 881 is generally applicable to light sources as described herein, including the light sources of system 1200 of FIG. 12.

As shown in FIG. 8, the optical system 800 further includes a polarizer 883. The light source 881 in combination with the polarizer 883 produces polarized light. As shown in FIG. 8, the polarizer 883 is a linear polarizer having a polarization orientation 884 at an angle θ with respect to the y axis. Alternately, the polarizer 883 may be a circular polarizer.

The optical system 800 also includes a polarization analyzer 885. The polarization analyzer 885 may include an additional polarizer. As previously discussed with respect to FIG. 7, the polarization of the light emerging from the chemically strengthened glass cover member 852 may be different than the polarization of the light entering the chemically strengthened glass cover member 852. The polarization analyzer 885 may be used to "combine" polarization components of the light. For example, the polarization components of the light may be combined into a single plane. Therefore, the polarization of the light emerging from the polarization analyzer may be different than the polarization of the light entering the polarization analyzer.

The light emerging from the polarization analyzer 885 may be used to obtain information about the stresses present in the chemically strengthened glass cover member 852. In some cases, light from the polarization analyzer may form a photoelastic pattern, such as an isochromic pattern alone or in combination with an isoclinic pattern. Light from the photoelastic pattern may be detected to form an image of the chemically strengthened glass cover member 852.

The photoelastic pattern may be an interference pattern. When the polarized light is directed onto the chemically strengthened glass cover member in a direction parallel to its thickness, the resulting interference pattern may contain information about membrane stresses in the chemically strengthened glass cover member. Two dimensional photoelasticity methods may be used to analyze these membrane stresses (also referred to herein as area stresses) as will be described in more detail with respect to FIG. 9.

The sensor 887 may be any of a variety of devices used to detect light. For example, the sensor 887 may be a semiconductor device such as a photodiode. The sensor may be an image sensor such a charge-coupled device (CCD) sensor or a complementary metal-oxide semiconductor (CMOS) sensor. The sensor 887 may also be referred to as a detector herein. The sensor 887 may be configured to produce an electrical output which corresponds to an intensity or a color value (e.g., a red, green, or blue value) of the light received at a given location of the sensor (e.g., at a given pixel of the sensor). In some cases, the sensor 887 and the polarization analyzer 885 may be combined in a system component such as a polariscope or a strain viewer.

Optical systems suitable for use with the methods described herein may include elements in addition to the optical elements shown in FIG. 8. For example, such an optical system may include one or more of a compensator, a quarter wave plate, or a full wave plate. In addition, optical systems may include a computing device and/or other devices which support automation of photoelastic measurements.

Figure 9:
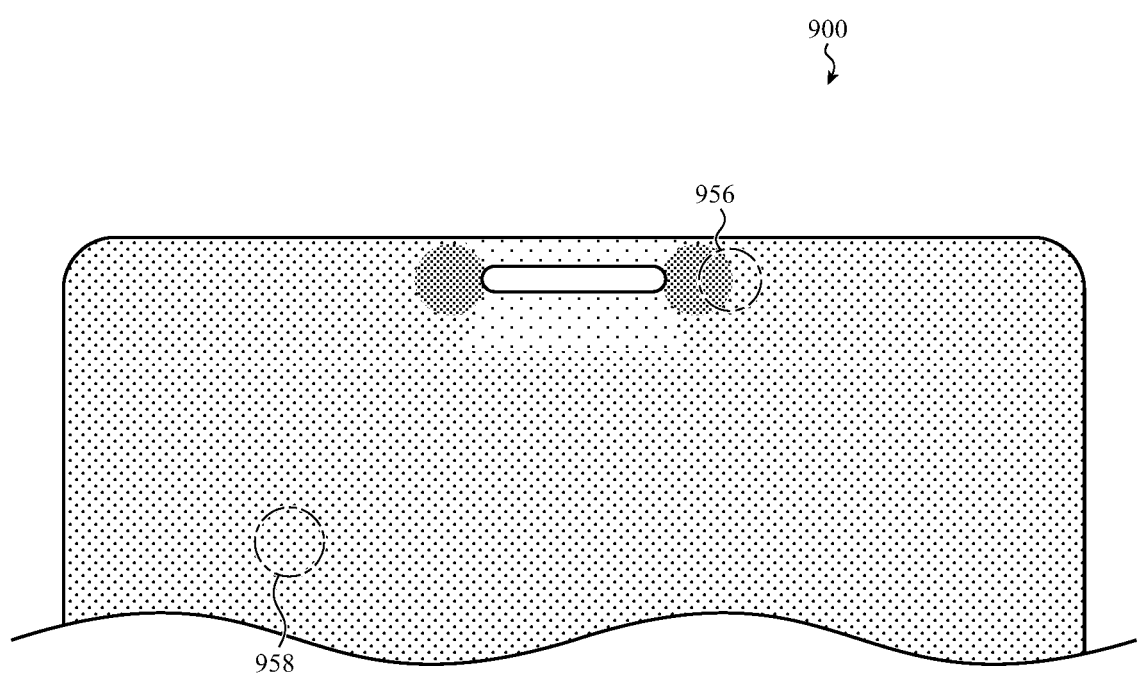
FIG. 9 shows an example of an image of a chemically strengthened glass cover member.

FIG. 9 schematically shows an example of an image 900 of a chemically strengthened glass cover member. The image 900 may be a photoelastic image containing information about the stresses present in the chemically strengthened glass cover member. The chemically strengthened glass cover member may be an example of glass cover members 152, 252, 352, or any other glass cover members described herein and, for brevity, the description of these glass cover members is not repeated here.

In the example of FIG. 9, the image 900 is a grayscale image that includes different lightness values. The differences in lightness values are schematically shown in FIG. 9 with stippling, with a greater density of dots corresponding to a reduced lightness value. The differences in lightness values create contrast between different regions of the image. In some cases, the lightness value of a given region of the image relates to the intensity of the light received by a device used to detect the photoelastic pattern. The optical measurement provided by the sensor may therefore be an intensity measurement. In additional embodiments, the image 900 may be a color image and the optical measurement(s) provided by the sensor may be one or more color values. As previously discussed with respect to FIG. 8, the sensor may provide an electrical output corresponding to the optical measurement.

The first region 956 of the image 900 may have a first lightness value. The first region 956 may correspond to a first portion of the glass cover member which at least partially defines a curved boundary of an opening in the glass cover member (as previously described with respect to FIGS. 2-4). A second region 958 of the image 900 may have a second lightness value different than the first lightness value. The second region 958 of the image may correspond to a second portion of the glass cover member located away from the opening. In some cases, the distance between the second portion of the glass cover member and the opening is greater than or equal to a thickness of the chemically strengthened glass cover member.

In some embodiments, the difference between the first lightness value of the first region 956 of the image and the second lightness value of the second region 958 of the image can be used as a quality control check for a level of chemical strengthening of the glass cover member. For example, the measured difference between the first and second lightness values can be compared to a target range for the difference between the first and the second lightness values. When the measured difference between the first and second lightness values exceeds this target range, the level of chemical strengthening may be higher than desired. Similarly, when the measured difference between the first and second lightness values is below this target range, the level of chemical strengthening may be lower than desired.

In some embodiments, the first lightness value of the first region 956 of the image or the difference between the first lightness value of the first region 956 and the second lightness value of the second region 958 of the image can be used to estimate a localized stress level in a first portion of the glass cover member. In general, the intensity value of a region of the photoelastic image is related to the difference in principal stresses of a corresponding portion of the glass cover member, as is explained in further detail below. In some embodiments, a localized stress level may be estimated by determining the difference in principal stresses $\sigma_1 - \sigma_2$ in a given portion of the glass cover member. When the given portion of the glass cover member is at an edge or side surface (including at the edge or boundary of an opening), one of the principal stresses may be zero and a localized stress level may be estimated by determining the value of the non-zero principal stress. In some cases, the value of the non-zero principal stress may provide an estimate of an edge stress value at the edge or side surface. In additional cases, the localized stress value of a region of the image can be estimated when the region is at the center of a light fringe or a dark fringe.

If the localized stress level in a first portion of the glass cover member is known, the localized stress level in the second portion of the glass cover member can be estimated in several ways. For example, when the first portion is located near an opening or other geometric feature in the glass cover member and the second portion is located away from the opening, the localized stress level in the first portion may be equal to a localized stress level in the second portion times a stress multiplier value. The localized stress level in the second portion may therefore be estimated as the localized stress level in the first portion divided by the stress multiplier value. The localized stress level in the second portion may also be estimated by comparing the second lightness value to a lightness value of a reference chemically strengthened glass cover member having a known localized stress level.

In some embodiments, the first lightness value of the first region 956 of the image or the difference between the first lightness value of the first region 956 and the second lightness value of the second region 958 of the image can be used to estimate a localized stress level in a first portion of the glass cover member. The description provided herein with respect to lightness values of a given region of the image may also be applicable to one or more color values of a given region of the image.

In general, the intensity value of a region of the photoelastic image is related to the difference in principal stresses of a corresponding portion of the glass cover member. The intensity at any given region of the photoelastic image can be related to a phase difference $\Delta$ of the interfering light. The relationship between the phase difference $\Delta$ and the intensity may depend upon the measurement technique used (e.g. whether a dark-field or a light-field technique is used). The phase difference $\Delta$ may be related to a retardation value $\delta$ by the relationship $\Delta = 2\pi\delta/\lambda$, where $\lambda$ is the wavelength of light. The retardation value $\delta$ may also be referred to herein as a fringe order. The retardation value $\delta$ gives at least some information about the stress in the chemically strengthened glass cover member. For example, the difference in principal stresses $\sigma_1 - \sigma_2$ may be equal to $\delta/(CD)$, where C is a photoelastic constant and D is a thickness of the chemically strengthened glass cover member.

The retardation value or phase difference of a region of the image can be determined in several ways. In some cases, the retardation value for a pixel of the image can be determined by comparing an intensity value or one or more color values of the pixel to a set of calibration values for the system. The set of calibration values may be in the form of a scale or a table such as a look-up table. For example, for RGB photoelasticity using a white light source and a RGB detector, the retardation for a given pixel can be determined by comparing its color values (e.g., the red (R), green (G), and blue (B) values) to values in the calibration table or look-up table. The comparison may be an automated comparison. In additional cases, the phase difference or retardation value can be determined by analyzing the variation in the signal from a pixel of the image for multiple positions of the analyzer (e.g., when the analyzer is rotated). In a dark-field isochromic pattern the centers of dark fringes are integral values of the retardation value $\delta$ and in a light-field isochromic pattern the centers of light fringes are integral values of the retardation value $\delta$.

The stresses in the glass cover member can also be determined in several ways. In some cases, the stresses can be determined from retardation values or phase difference values, alone or in combination with additional information. For example, the stresses may be determined numerically based on the retardation values or phase difference values. In additional cases, an intensity value of a given region of the image may be referenced to a reference (e.g., background) value and this referenced intensity value may be used to estimate a localized stress value of a portion of the chemically strengthened glass cover member. For example, the difference between the first lightness value of the first region 956 of the image and the second lightness value of the second region 958 of the image may be used to provide a referenced intensity value (also referred to as a relative intensity value). The referenced intensity value may be used to estimate a localized stress value of the first portion of the chemically strengthened glass cover member. If the first region 956 is at the center of a light fringe or a dark fringe, a retardation value $\delta$ of the first region 956 can be determined from the interference pattern and used to estimate a localized stress level in a first portion of the glass cover member.

In some cases, the optical anisotropy or iridescence of a portion of the cover member can also be predicted from the retardation value or the phase difference. The methods disclosed herein can therefore also be used to predict whether the optical anisotropy of the cover member will be unacceptably high under particular viewing conditions.

Figure 10:
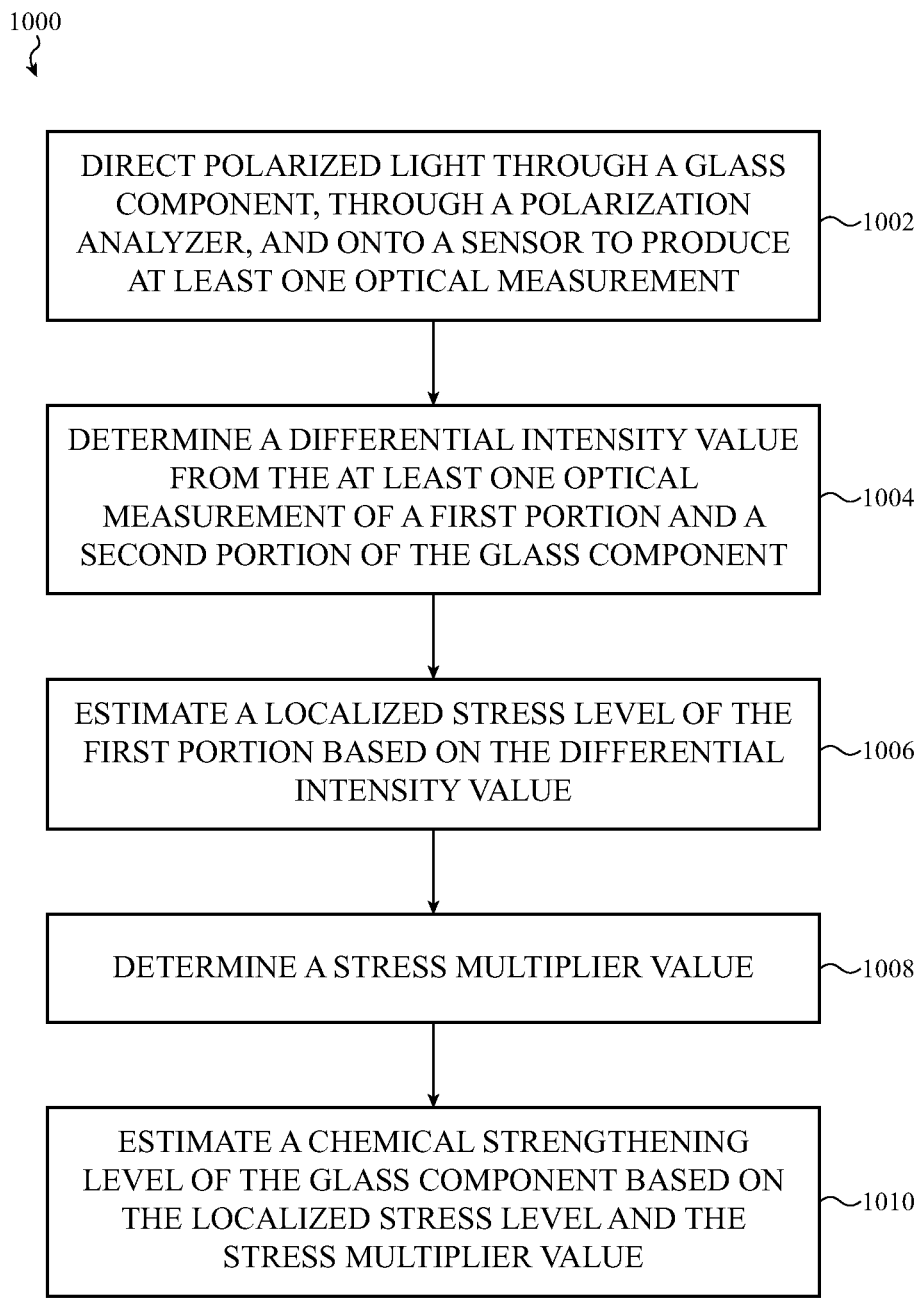
FIG. 10 shows a flow chart of a process for evaluating a glass component.

FIG. 10 shows a flow chart of a process 1000 for evaluating a chemically strengthened glass component of an electronic device. For example, the process 1000 may allow estimation of a level of chemical strengthening of the glass component. The glass component may be a glass cover member. The glass component may be an example of glass cover members 152, 252, 352, or any other glass cover members described herein and, for brevity, the description of these glass cover members is not repeated here. The process 1000 may also be applicable to other types of chemically strengthened transparent components as described herein.

An operation 1002 of the process 1000 comprises directing polarized light through the glass component. The polarized light may be produced by a light source in combination with a polarizer. The polarizer may be a linear polarizer having a first polarization axis. Alternately, the polarizer may produce elliptically polarized or circularly polarized light. For example, a polarizer configured to produce elliptically polarized or circularly polarized light may include a linear polarizer and a quarter wave plate. In some cases, a lens or other optical element may be placed between the polarizer and the chemically strengthened glass component. The light source may produce monochromatic light or light covering a wider spectrum, such as the visible spectrum of light. Additional description of light sources is provided with respect to FIG. 8 and that description is generally applicable herein.

The operation 1002 of the process 1000 further comprises directing the polarized light through a polarization analyzer after it emerges from the glass component. As previously discussed with respect to FIG. 8, the polarization analyzer may include a polarizer. When the polarized light is produced by a light source in combination with a first polarizer, the polarization analyzer may include a second polarizer. The first polarizer may have a first orientation and the second linear polarizer may have a second orientation different from the first orientation (and not equivalent to the first orientation). For example, when the first and the second polarizers are linear polarizers the second polarization may be rotated with respect to the first orientation by an angle greater than zero degrees and less than 180 degrees. Additional description of polarization analyzers is provided with respect to FIG. 8 and that description is generally applicable herein. The operation of the polarization analyzer may be automated and measurements may be performed at multiple positions of the analyzer.

The operation 1002 of the process 1000 further comprises directing the polarized light onto a sensor after it emerges from the polarization analyzer. The sensor may be used to detect light and produce at least one optical measurement. The light may be detected with an image sensor, such as a charge-coupled device (CCD) sensor or a complementary metal-oxide semiconductor (CMOS) sensor. Additional description of sensors is provided with respect to FIG. 8 and that description is generally applicable herein.

An operation 1004 of the process 1000 comprises determining a differential intensity value from at least one optical measurement of a first portion and a second portion of the glass component. For example, the operation 1004 may comprise determining a first intensity value corresponding to the first portion and a second intensity value corresponding to the second portion. The operation 1004 may further comprise determining a difference between the first intensity value and the second intensity value. The first portion of the glass component may be located near an opening or other geometric feature in the glass component (e.g., portion 357 of FIG. 3). For example, the first portion of the glass component may at least partially define a curved boundary of an opening in the glass component. The second portion of the glass component may be located away from the geometric feature in the glass component (e.g., portion 358 of FIG. 3).

An operation 1006 of the process 1000 comprises estimating a localized stress level of the first portion based on the differential intensity value. The localized stress level of the first portion may be estimated as described with respect to FIG. 9 and, for brevity, that discussion is not repeated here.

An operation 1008 of the process 1000 comprises determining a stress multiplier value. The stress multiplier value is typically estimated based on the shape of the geometric feature. When the geometric feature is an opening, the stress multiplier may be based on a curvature of a boundary defining the opening (e.g., a maximum curvature). As an example, the stress multiplier value may be estimated based on a finite element calculation of the residual stress in the chemically strengthened glass component. As an additional example, the stress multiplier value may be estimated based on previously measured or calculated stress concentration values for comparable stress loadings and opening shapes. The stress multiplier value may be estimated similarly when the geometric feature is a projection or other feature which may lead to a concentration of residual stress.

The operation 1008 may further include an operation of obtaining an estimate of the curvature of the curved boundary. In some cases, the curvature may be obtained based on a specified curvature of the curved boundary (e.g., a product specification for the glass component). In other cases, the curvature of the part may be measured, such as with a measuring microscope or using a machine vision technique as described with respect to optical inspection unit 1210 of system 1200.

An operation 1010 of the process 1000 comprises estimating a chemical strengthening level of the glass component. In some cases, the operation of estimating the chemical strengthening level may be based on the localized stress level (of the first portion) and the stress multiplier value. For example, the chemical strengthening level of the glass component may be estimated by estimating a compressive surface stress of a compressive stress region or layer. In addition, the chemical strengthening level of the glass component may be estimated by estimating a depth of a compressive stress region or layer. For example, the depth of the compressive stress region may be estimated based on an estimate of the compressive surface stress and a predicted relationship between stress and distance into the part (e.g., along the thickness). The predicted relationship between stress and thickness may be at least partially based on an experimental measurement of stress as a function of thickness for one or more reference samples. As an additional example, the depth of the compressive stress region or other measure of the chemical strengthening level may be based on a correlation between one or more of the localized stress levels estimated in operation 1006 and the chemical strengthening level.

The process 1000 may further comprise one or more operations. For example, the process 1000 may further comprise an operation of comparing the first localized stress level to a reference stress range. In addition, the process 1000 may further comprise comparing the chemical strengthening level of the glass component to a reference chemical strengthening range. Further, the process 1000 may comprise an operation of estimating a second localized stress level at the second portion of the glass component. In addition, when an operation of comparing indicates that a localized stress level or chemical strengthening level is outside a target range the glass component may be rejected and/or discarded.

Figure 11:
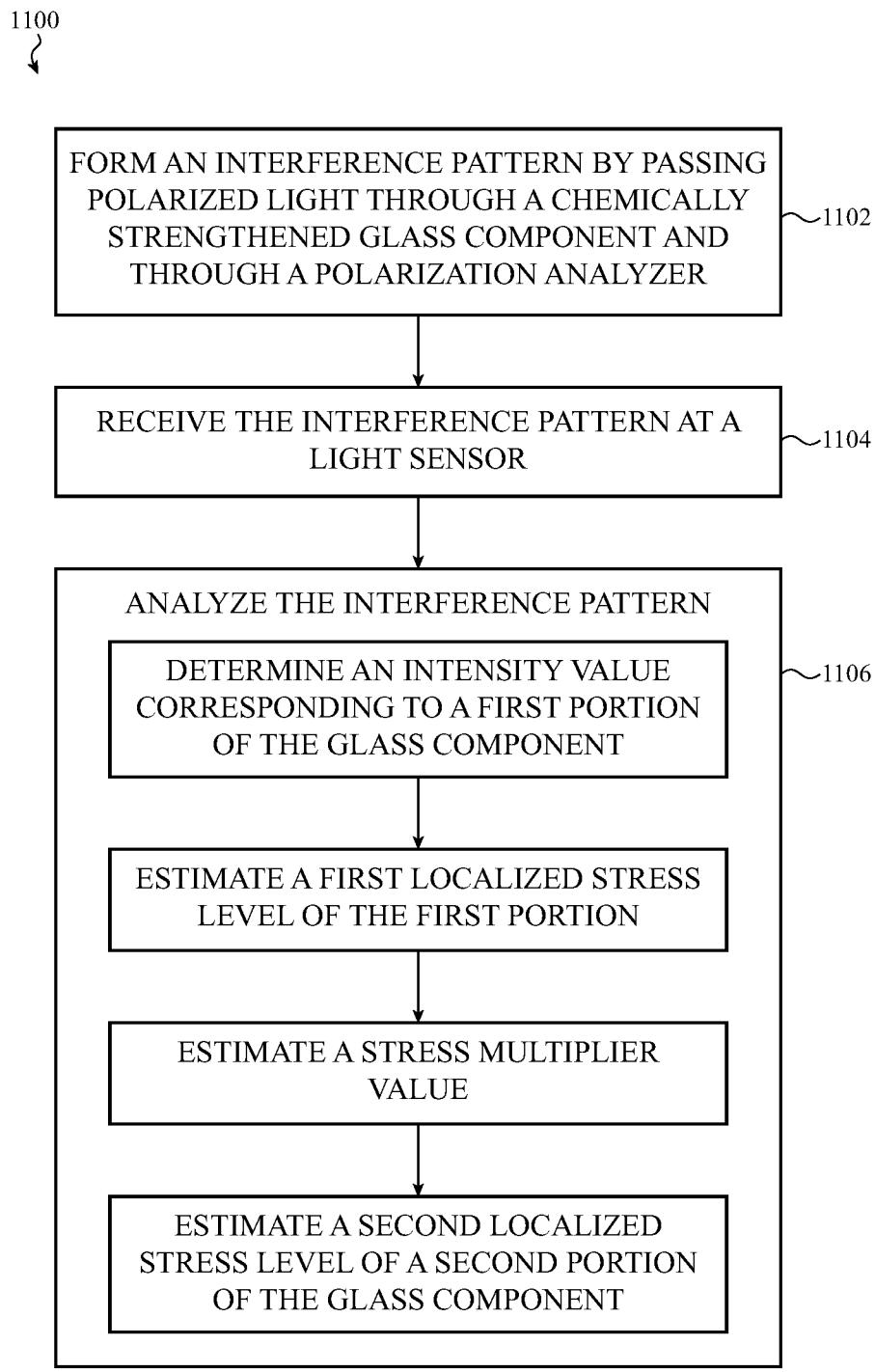
FIG. 11 shows a flow chart of another process for evaluating a glass component.

FIG. 11 shows another example of a process 1100 for evaluating a chemically strengthened glass component of an electronic device. Process 1100 may allow estimation of a stress level in the chemically strengthened glass component. As previously described, the glass component may be a glass cover member. The chemically strengthened glass component may be an example of glass cover members 152, 252, 352, or any other glass cover members described herein and, for brevity, the description of these glass cover members is not repeated here. Process 1100 may also be applicable to other types of chemically strengthened transparent components as described herein.

An operation 1102 of process 1100 comprises forming an interference pattern. The operation 1102 comprises passing polarized light through a chemically strengthened glass component and through a polarization analyzer. These steps of operation 1102 may be similar to the steps of directing the polarized light through the glass component and through the polarization analyzer of the operation 1002 of the process 1000 and, for brevity, the details of the operation 1002 are not repeated here.

An operation 1104 of the process 1100 comprises receiving the interference pattern at a light sensor. The sensor may be similar to the sensors described with respect to FIGS. 8 and 10 and, for brevity, those details are not repeated here.

An operation 1106 of process 1100 comprises analyzing the interference pattern. As shown in FIG. 11, the operation 1106 comprises determining an intensity value corresponding to a first portion of the glass component. The first portion of the glass component may be located near an opening or other geometric feature in the glass component. For example, the first portion may at least partially define a curved boundary of an opening in the glass component. The operation 1106 further comprises estimating a first localized stress level of the first portion, which may be based on the intensity value. These steps of the operation 1106 may be similar to the steps of determining the intensity values and the first localized stress level previously described with respect to the operations 1004 and 1006 of the process 1000 and, for brevity, the details are not repeated here.

The operation 1106 further comprises estimating a stress multiplier value for the first portion of the glass component. In some cases, estimation of the stress multiplier value is based on a curvature of the curved boundary of the opening in the glass component. This portion of the operation 1106 may be similar to that previously described with respect to the operation 1008 of the process 1000 and, for brevity, the details are not repeated here. Optionally the operation 1106 further comprises measuring the curvature of the curved boundary. The curvature may be measured with an optical inspection unit as described with respect to FIG. 12 or by other optical measurement techniques.

The operation 1106 further comprises estimating a second localized stress level of a second portion of the chemically strengthened glass component. The estimation of the second localized stress level may be based on the first localized stress level and a stress multiplier value. The second portion may be located away from the opening in the glass component. In some cases the second localized stress level may be estimated as the first localized stress level divided by the stress multiplier value as previously discussed with respect to FIG. 9.

In additional cases, the operation 1106 of analyzing the interference pattern may comprise an alternate sequence of operations. For example, the operation 1106 may comprise determining a first intensity value corresponding to the first portion of the chemically strengthened glass component and a second intensity value corresponding to a second portion of the chemically strengthened glass component, determining respective retardation values of the first and the second portions based on these intensity values, and determining localized stress levels of the first and the second portions based on these retardation values by any of the applicable procedures previously described with respect to FIG. 9. The description provided with respect to FIG. 9 is generally applicable herein and, for brevity, is not repeated here.

As previously described for process 1000, process 1100 may further comprise one or more operations. For example, the process 1100 may further comprise an operation of comparing the first localized stress level and/or the second localized stress level to a reference stress range. As another example, the process 1100 may further comprise an operation of estimating a chemical strengthening level of the glass component based on the first localized stress level, the second localized stress level, or a combination thereof. In addition, the process 1100 may further comprise comparing the chemical strengthening level of the glass component to a reference chemical strengthening range. Further, when an operation of comparing indicates that a localized stress level or chemical strengthening level is outside a target range the glass component may be rejected and/or discarded.

Figure 12:
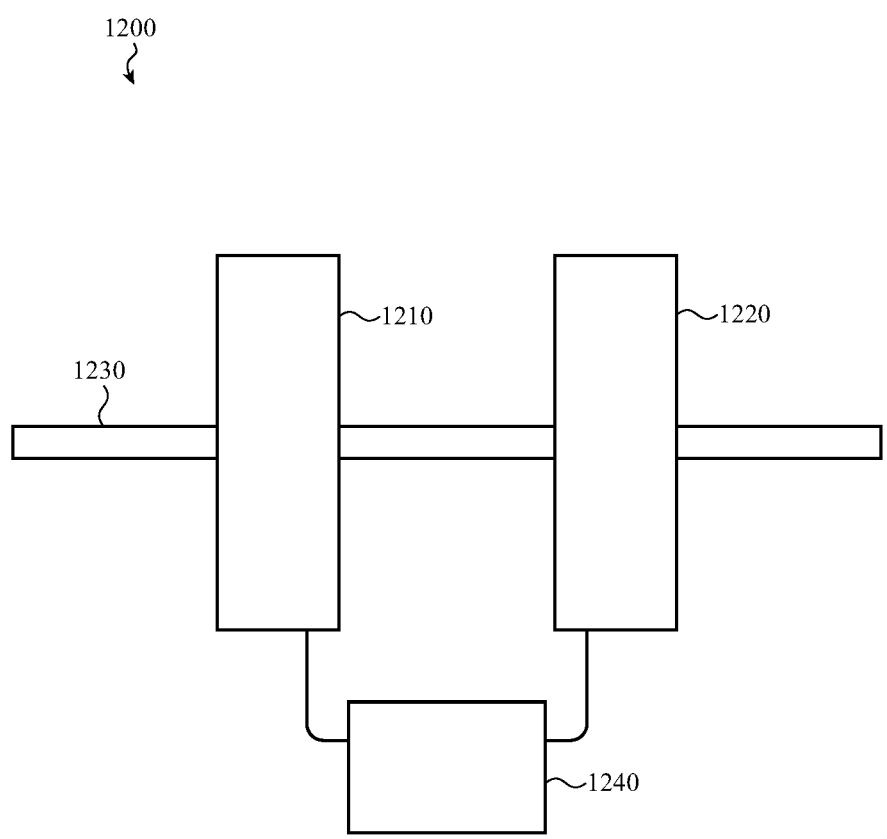
FIG. 12 shows a system for evaluating a chemically strengthened glass cover member.

FIG. 12 schematically shows a system 1200 for evaluating a chemically strengthened glass component such as a glass cover member. The system 1200 may be configured to measure an opening or other geometric feature in the glass component. The system 1200 may also be configured to analyze the residual stresses in the glass component resulting from the chemical strengthening process. As shown in FIG. 12, the system 1200 comprises a first optical inspection unit 1210, a second optical inspection unit 1220, a transport device 1230, and a computing device 1240.

The first optical inspection unit 1210 may be configured to measure an opening in the chemically strengthened glass component. In particular, the optical inspection unit 1210 may be configured to measure a curvature of a boundary of the opening in the glass component. The curvature may be measured or estimated using machine vision. For example, the curvature may be measured or estimated using edge detection and/or edge analysis conducted over the respective region of the image. The first optical inspection unit may be an automated optical inspection unit (AOI). An automated optical inspection unit may also be referred to herein as an automatic visual inspection unit. In some cases the first inspection unit 1210 or another component of the system 1200 is configured to measure a thickness of the glass component.

The first optical inspection unit 1210 may include a first light source and a first image acquisition device. The first light source may be any light source suitable for determining the dimensions of the opening in the chemically strengthened glass component. The first image acquisition device may include an image sensor, such as a charge-coupled device (CCD) sensor or a complementary metal-oxide semiconductor (CMOS) sensor. The first optical inspection unit 1210 may also include a first processor. The first optical inspection unit 1210 may be configured to receive input from the image sensor and to determine a curvature value and optionally other dimensions of the opening in the glass component using the first processor.

The second optical inspection unit 1220 may be configured to obtain at least one optical measurement of the chemically strengthened glass component which is suitable for analyzing the residual stress in one or more portions of the glass component resulting from the chemical strengthening process. The second optical inspection unit 1220 may be configured to obtain an image of the chemically strengthened glass component. The second optical inspection unit 1220 may include a second light source, a polarizer, an analyzer, and a second image acquisition device. The second optical inspection unit 1220 may also include a second processor. In some cases, the computing device 1240 may be configured to receive the input from the second image acquisition device and to determine the residual stress(es). The second optical inspection unit may be an automated optical inspection unit.

The second light source may produce monochromatic light or light covering a wider spectrum, such as over the visible spectrum of light. The polarizer, in combination with the second light source, produces polarized light. The polarizer may be a linear polarizer having a first polarization axis. Alternately, the polarizer may produce elliptically polarized or circularly polarized light. For example, a polarizer configured to produce elliptically polarized or circularly polarized light may include a linear polarizer and a quarter wave plates.

The analyzer may be configured to produce an interference pattern by combining polarization components of the light emerging from the chemically strengthened glass component. For example, the analyzer may be configured to act as a second polarizer. In some cases, the analyzer may include a second linear polarizer having a second polarization axis. Typically the second polarization axis is rotated with respect to the first polarization axis and may be at about ninety degrees with respect to the first polarization axis. As an additional example, the analyzer may include a second linear polarizer and a second quarter wave plate.

The second image acquisition device may be similar to the first image acquisition device and for brevity that description is not repeated here. In some cases the second image acquisition device is color image acquisition device such as a 3CCC, a tri-linear, or a Bayer pattern camera. The second processor of the second optical inspection unit may be configured to determine the intensity values (or lightness values) at various regions of the image.

In some embodiments, the first optical inspection unit 1210 and the second optical inspection unit 1220 share components. As an example, the first image sensor and the second image sensor may share components. Further, the first processor and the second processor may share components. In additional embodiments, the first image sensor and the second image sensor are different from one another. The first processor and the second processor may also be different from one another.

As shown in FIG. 12, the system 1200 further comprises a transport device 1230. Inclusion of a transport device 1230 in the system 1200 may be optional, such as when the first optical inspection unit 1210 and the second optical inspection unit 1220 share components.

The transport device may be any such device known to the art capable of transporting the chemically strengthened glass component without scratching or otherwise damaging it.

The transport device 1230 is configured to deliver the glass component from the first optical inspection unit to the second optical inspection unit. In addition, the transport device 1230 may be further configured to discard the glass component when receiving a signal from the computing system 1240, as discussed in further detail below.

The system 1200 further comprises a computing device 1240. As shown in FIG. 12, the computing device 1240 is in communication with the first optical inspection unit and the second optical inspection unit. The computing device 1240 may comprise a memory containing instructions and a third processor configured to execute the instructions and thereby cause the computing system to perform operations.

The operations may include receiving the curvature value from the first optical inspection unit and estimating a stress multiplier value based on the curvature value. The operations may further include estimating a first localized stress level in the first portion of the glass component based on a difference between the first intensity value and the second intensity value. The operations may further include estimating a chemical strengthening level of the glass component based on the localized stress level and the stress multiplier value. In addition, the operations may include estimating a second localized stress level in the second portion of the glass component. The estimation of the second localized stress level may be based on the first localized stress level and the stress multiplier value.

In addition, the third processor may be configured to cause the computing system to compare the first localized stress level and the second localized stress level to the reference stress range and/or to compare the chemical strengthening level to a reference chemical strengthening range. The third processor may be configured to cause the computing system to provide a signal when the first localized stress level and/or the second localized stress level is outside the reference stress range. The third processor may also be configured to provide a signal when the chemical strengthening level is outside the reference chemical strengthening range. The system may be configured to respond to the signal by discarding the glass component. For example, the signal may be provided to the transport system and the transport system may respond by discarding the glass component.

The foregoing description provides an example of a system for estimating a stress level in a glass component such as a glass cover member. Modifications and variations of system 1200 are also within the scope of the disclosure herein. For example, a system may also be configured to perform the operations of the method described in FIG. 11 or of any other method described herein.

Figure 13:
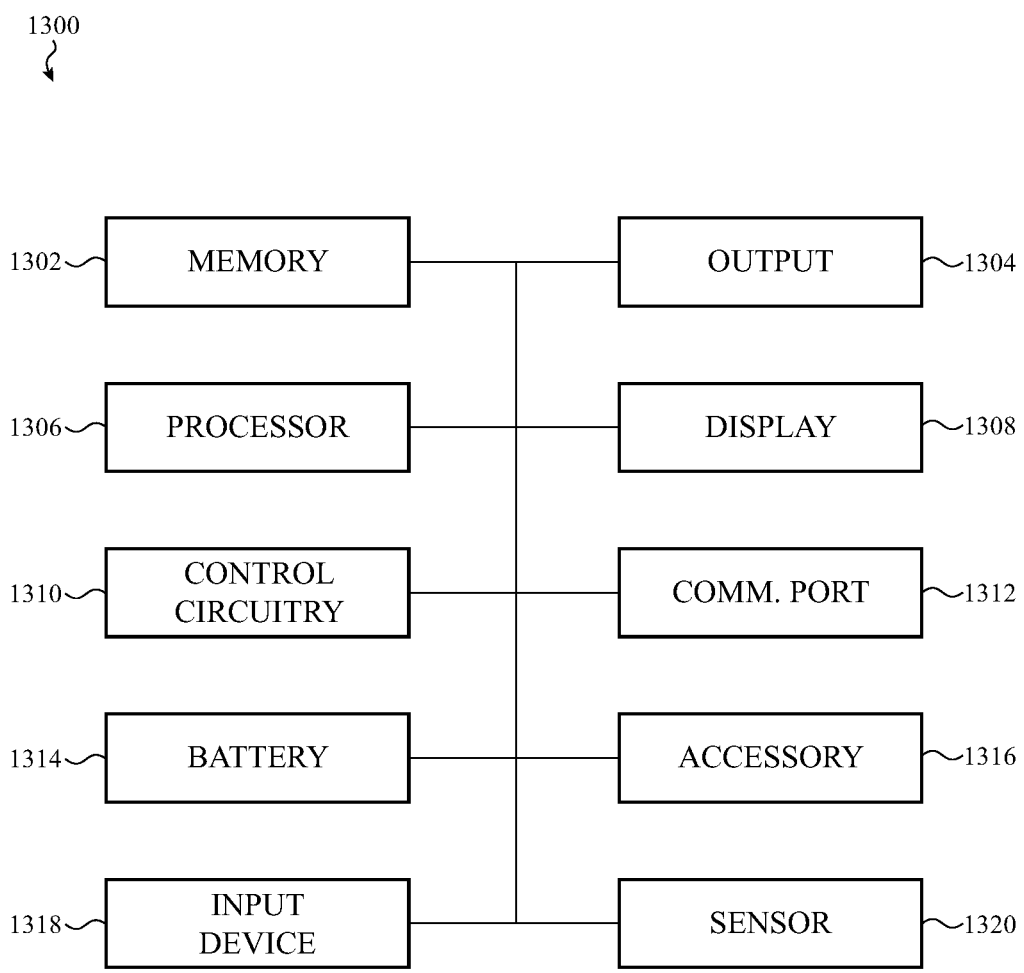
FIG. 13 shows a block diagram of components of an electronic device.

FIG. 13 shows a block diagram of a sample electronic device that can incorporate a transparent component as described herein. The schematic representation depicted in FIG. 13 may correspond to components of the devices depicted in FIG. 1A-12 as described above. However, FIG. 13 may also more generally represent other types of electronic devices with cover assemblies as described herein.

In embodiments, an electronic device 1300 may include sensors 1320 to provide information regarding configuration and/or orientation of the electronic device in order to control the output of the display. For example, a portion of the display 1308 may be turned off, disabled, or put in a low energy state when all or part of the viewable area of the display 1308 is blocked or substantially obscured. As another example, the display 1308 may be adapted to rotate the display of graphical output based on changes in orientation of the device 1300 (e.g., 90 degrees or 180 degrees) in response to the device 1300 being rotated.

The electronic device 1300 also includes a processor 1306 operably connected with a computer-readable memory 1302. The processor 1306 may be operatively connected to the memory 1302 component via an electronic bus or bridge. The processor 1306 may be implemented as one or more computer processors or microcontrollers configured to perform operations in response to computer-readable instructions. The processor 1306 may include a central processing unit (CPU) of the device 1300. Additionally, and/or alternatively, the processor 1306 may include other electronic circuitry within the device 1300 including application specific integrated chips (ASIC) and other microcontroller devices. The processor 1306 may be configured to perform functionality described in the examples above.

The memory 1302 may include a variety of types of non-transitory computer-readable storage media, including, for example, read access memory (RAM), read-only memory (ROM), erasable programmable memory (e.g., EPROM and EEPROM), or flash memory. The memory 1302 is configured to store computer-readable instructions, sensor values, and other persistent software elements.

The electronic device 1300 may include control circuitry 1310. The control circuitry 1310 may be implemented in a single control unit and not necessarily as distinct electrical circuit elements. As used herein, "control unit" will be used synonymously with "control circuitry." The control circuitry 1310 may receive signals from the processor 1306 or from other elements of the electronic device 1300.

As shown in FIG. 13, the electronic device 1300 includes a battery 1314 that is configured to provide electrical power to the components of the electronic device 1300. The battery 1314 may include one or more power storage cells that are linked together to provide an internal supply of electrical power. The battery 1314 may be operatively coupled to power management circuitry that is configured to provide appropriate voltage and power levels for individual components or groups of components within the electronic device 1300. The battery 1314, via power management circuitry, may be configured to receive power from an external source, such as an alternating current power outlet. The battery 1314 may store received power so that the electronic device 1300 may operate without connection to an external power source for an extended period of time, which may range from several hours to several days.

In some embodiments, the electronic device 1300 includes one or more input devices 1318. The input device 1318 is a device that is configured to receive input from a user or the environment. The input device 1318 may include, for example, a push button, a touch-activated button, capacitive touch sensor, a touch screen (e.g., a touch-sensitive display or a force-sensitive display), capacitive touch button, dial, crown, or the like. In some embodiments, the input device 1318 may provide a dedicated or primary function, including, for example, a power button, volume buttons, home buttons, scroll wheels, and camera buttons.

The device 1300 may also include one or more sensors 1320, such as a force sensor, a capacitive sensor, an accelerometer, a barometer, a gyroscope, a proximity sensor, a light sensor, or the like. The sensors 1320 may be operably coupled to processing circuitry. In some embodiments, the sensors 1320 may detect deformation and/or changes in configuration of the electronic device and be operably coupled to processing circuitry which controls the display based on the sensor signals. In some implementations, output from the sensors 1320 is used to reconfigure the display output to correspond to an orientation or folded/unfolded configuration or state of the device. Example sensors 1320 for this purpose include accelerometers, gyroscopes, magnetometers, and other similar types of position/orientation sensing devices. In addition, the sensors 1320 may include a microphone, acoustic sensor, light sensor, optical facial recognition sensor, or other types of sensing device.

In some embodiments, the electronic device 1300 includes one or more output devices 1304 configured to provide output to a user. The output device 1304 may include display 1308 that renders visual information generated by the processor 1306. The output device 1304 may also include one or more speakers to provide audio output. The output device 1304 may also include one or more haptic devices that are configured to produce a haptic or tactile output along an exterior surface of the device 1300.

The display 1308 may include a liquid-crystal display (LCD), light-emitting diode (LED) display, an LED-backlit LCD display, organic light-emitting diode (OLED) display, an active layer organic light-emitting diode (AMOLED) display, organic electroluminescent (EL) display, electrophoretic ink display, or the like. If the display 1308 is a liquid-crystal display or an electrophoretic ink display, the display 1308 may also include a backlight component that can be controlled to provide variable levels of display brightness. If the display 1308 is an organic light-emitting diode or organic electroluminescent-type display, the brightness of the display 1308 may be controlled by modifying the electrical signals that are provided to display elements. In addition, information regarding configuration and/or orientation of the electronic device may be used to control the output of the display as described with respect to input devices 1318. In some cases, the display is integrated with a touch and/or force sensor in order to detect touches and/or forces applied along an exterior surface of the device 1300.

The electronic device 1300 may also include a communication port 1312 that is configured to transmit and/or receive signals or electrical communication from an external or separate device. The communication port 1312 may be configured to couple to an external device via a cable, adaptor, or other type of electrical connector. In some embodiments, the communication port 1312 may be used to couple the electronic device to a host computer.

The electronic device 1300 may also include at least one accessory 1316, such as a camera, a flash for the camera, or other such device. The camera may be included in a camera assembly. The camera may be connected to other parts of the electronic device 1300 such as the control circuitry 1310.

As used herein, use of the term "about" in reference to the endpoint of a range may signify a variation of +/−5%, +/−2%, or +/−1% of the endpoint value. In addition, disclosure of a range in which at least one endpoint is described as being "about" a specified value includes disclosure of the range in which the endpoint is equal to the specified value.

The following discussion applies to the electronic devices described herein to the extent that these devices may be used to obtain personally identifiable information data. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A method comprising:
    directing polarized light through a glass cover member, through a polarization analyzer, and onto a sensor, the polarized light directed through a first portion of the glass cover member and through a second portion of the glass cover member, the first portion of the glass cover member at least partially defining a curved boundary of an opening in the glass cover member and the second portion of the glass cover member located away from the opening;
    obtaining, using the sensor, a first optical measurement of polarized light from the first portion of the glass cover member that is directed through the polarization analyzer and a second optical measurement of polarized light from the second portion of the glass cover member that is directed through the polarization analyzer;
    determining a differential intensity value based on the first and the second optical measurements;
    determining an estimated stress level of the first portion of the glass cover member, the estimated stress level based on the differential intensity value;
    determining an estimated level of chemical strengthening of the second portion of the glass cover member based on the estimated stress level and a stress multiplier value that is determined based on an estimate of a curvature of a region of the curved boundary defined by the first portion of the glass cover member;
    comparing the estimated level of chemical strengthening to a reference chemical strengthening range; and
    determining whether the estimated level of chemical strengthening falls within the reference chemical strengthening range.

2. The method of claim 1, wherein:
    the glass cover member is part of an enclosure for a mobile phone;
    the opening is elongated and provides a speaker port for an earpiece of the mobile phone; and
    the curved boundary is located along an end of the opening.

3. The method of claim 1, further comprising:
    comparing the estimated stress level of the first portion of the glass cover member to a reference stress range; and
    rejecting the glass cover member when the estimated stress level of the first portion of the glass cover member is outside the reference stress range.

4. The method of claim 1, further comprising:
    determining an estimated level of chemical strengthening of the first portion of the glass cover member; and
    rejecting the glass cover member when the estimated level of chemical strengthening of the first portion of the glass cover member is outside the reference chemical strengthening range.

5. The method of claim 1, further comprising estimating a stress level of the second portion of the glass cover member based on the estimated stress level of the first portion of the glass cover member and the stress multiplier value.

6. The method of claim 1, wherein a radius of the curvature of the curved boundary is less than or equal to 1 mm.

7. The method of claim 1, wherein the sensor produces an image of at least the first portion and the second portion of the glass cover member.

8. The method of claim 7, wherein:
    the sensor is a first sensor and the image is a first image; and
    the estimate of the curvature of the curved boundary is determined from a second image produced by a second sensor.

9. The method of claim 7, wherein the sensor is included in an image acquisition device of an optical inspection unit.

10. The method of claim 9, wherein: the first optical measurement of polarized light from the first portion of the glass cover member that is directed through the polarization analyzer provides a first intensity value; the second optical measurement of polarized light from the second portion of the glass cover member that is directed through the polarization analyzer; provides a second intensity value; and the differential intensity value is determined from the first and second intensity values.

11. The method of claim 9, wherein a computing device in communication with the optical inspection unit computes the estimated stress level and the estimated chemical strengthening level.

12. The method of claim 9, wherein:
    the optical inspection unit is a second optical inspection unit; and
    a first optical inspection unit is used to obtain the estimate of the curvature of the region of the curved boundary.

13. The method of claim 12, wherein the first optical inspection unit is used to acquire an image of the curved boundary of the opening.

14. A method comprising:
    forming an interference pattern by passing polarized light through a chemically strengthened glass cover member and through a polarization analyzer, the polarized light directed through at least a first portion of the chemically strengthened glass cover member and through a second portion of the chemically strengthened glass cover member;
    receiving the interference pattern at a light sensor;
    analyzing the interference pattern, the analyzing comprising:
        determining a first intensity value corresponding to polarized light from the first portion of the chemically strengthened glass cover member that is directed through the polarization analyzer, the first portion of the chemically strengthened glass cover member at least partially defining a curved boundary of an opening in the chemically strengthened glass cover member; and
        determining a second intensity value corresponding to polarized light from the second portion of the chemically strengthened glass cover member that is directed through the polarization analyzer, the second portion of the chemically strengthened glass cover member located away from the opening;
    determining an estimated first stress level of the first portion of the chemically strengthened glass cover member based on a difference between the first intensity value and the second intensity value;

determining an estimated second stress level of the second portion of the chemically strengthened glass cover member based on the estimated first stress level and a stress multiplier value estimated based on a curvature of a region of the curved boundary defined by the first portion of the chemically strengthened glass cover member;

comparing the estimated second stress level to a reference stress range; and determining whether the estimated second stress level is within the reference stress range.

15. The method of claim 14, wherein:

the opening is elongated and comprises two curved end portions and a straight portion extending between the two curved end portions; and the curved boundary is positioned within one of the two curved end portions of the opening.

16. The method of claim 14, wherein a distance between the second portion of the chemically strengthened glass cover member and the opening is greater than or equal to a thickness of the chemically strengthened glass cover member.

17. The method of claim 14, further comprising computing, from the first intensity value, an estimated phase difference of the polarized light from the first portion of the chemically strengthened glass cover member.

18. The method of claim 14, wherein:

the light sensor produces an image; and the difference between the first intensity value and the second intensity value produces a contrast difference in the image.

19. The method of claim 18, wherein the reference stress range is a second reference stress range and the method further comprises:

comparing the estimated first stress level to a first reference stress range; and determining whether the first estimated first stress level is within the first reference stress range.

* * * * *